US012803993B2

(12) United States Patent
Rodriguez et al.

(10) Patent No.: US 12,803,993 B2
(45) Date of Patent: Nov. 17, 2026

(54) METHODS AND SYSTEMS FOR DETECTING ATTACK CAMPAIGNS ON ELECTRONIC NETWORKS

(71) Applicant: MixMode, Inc., Santa Barbara, CA (US)

(72) Inventors: Nathaniel James-Michael Rodriguez, St. Louis, MO (US); Igor Mezic, Santa Barbara, CA (US)

(73) Assignee: MixMode, Inc., Santa Barbara, CA (US)

( * ) Notice: Subject to any disclaimer, the term of this patent is extended or adjusted under 35 U.S.C. 154(b) by 0 days.

(21) Appl. No.: 18/953,010

(22) Filed: Nov. 19, 2024

(65) Prior Publication Data

US 2025/0168178 A1 May 22, 2025

Related U.S. Application Data

(60) Provisional application No. 63/601,221, filed on Nov. 20, 2023.

(51) Int. Cl.
*H04L 29/06* (2006.01)
*H04L 9/40* (2022.01)

(52) U.S. Cl.
CPC ................................ *H04L 63/1416* (2013.01)

(58) Field of Classification Search
CPC . H04L 63/1416; H04L 63/14; H04L 63/1408; H04L 63/1425; H04L 63/1433; H04L 63/02; H04L 63/0227; H04L 63/10
See application file for complete search history.

(56) References Cited

U.S. PATENT DOCUMENTS

2022/0394082 A1* 12/2022 Keren ..................... H04L 41/14
2023/0275912 A1* 8/2023 Shahul .................... H04L 41/16 726/23
2024/0098118 A1* 3/2024 Kaznocha ............. H04L 63/205
2025/0141897 A1* 5/2025 Bechara Prado ... H04L 63/1425

* cited by examiner

*Primary Examiner* — Malcolm Cribbs

(57) ABSTRACT

The disclosed methods and systems detect attack campaigns on electronic networks by detecting and analyzing anomalous relationships between entities on the electronic networks, or between at least one entity on the electronic networks and an external entity, or between the one or more electronic networks as a whole and the external entity. The disclosed methods and systems generally correlate anomalous relationships to reduce the total number of alerts that a cybersecurity analyst must address. For known attack campaigns, the disclosed methods and systems may rapidly identify the attack campaign, allowing cybersecurity analysts to quickly apply recommended remediation techniques. The disclosed methods and systems maintain temporal information related to an attack campaign's progression, allowing the ranking and display of active campaigns so that cybersecurity analysts may direct their attention to the most immediate and threatening attacks, reducing time-to-remediation and reducing the chance that the attack campaign will be successful.

20 Claims, 10 Drawing Sheets

METHODS AND SYSTEMS FOR DETECTING ATTACK CAMPAIGNS ON ELECTRONIC NETWORKS

The present application claims priority to U.S. Provisional Patent Application No. 63/601,221 filed on Nov. 20, 2023, entitled "METHODS AND SYSTEMS FOR DETECTING ATTACK CAMPAIGNS ON ELECTRONIC NETWORKS," which is incorporated herein by reference in its entirety for all purposes.

BACKGROUND

Technical Field

The disclosed embodiments generally relate to detecting attack campaigns on electronic networks.

Background

A major challenge in cybersecurity is the detection of attack campaigns (for instance, as defined by the MITRE att&ck framework). Attack campaigns represent a series of actions performed by a malicious actor on one or more electronic networks or cloud systems. For example, attack campaigns may involve incursion into a victim's electronic network or cloud system, followed by movement within the electronic network or cloud system to discover sensitive data, and subsequent exfiltration of said data. As another example, attack campaigns may involve simultaneous or sequential incursion into the electronic networks or cloud systems of two or more victims. Since many attack campaigns are novel, these attack campaigns may have characteristics never before identified. Unfortunately, current cybersecurity threat detection systems rely on comparing a malicious actor's actions to a catalog of known attack campaigns or the use of machine learning techniques using training sets comprising known attack campaigns. As such, current cybersecurity threat detection systems may have difficulty detecting novel attack campaigns.

Additionally, cybersecurity analysts may struggle to manually process the high volume of alerts generated by current threat detection systems. Often these alerts are false positives that distract from the handling of real attack campaigns. Even when a true positive is identified by the analyst, it can take considerable time and effort to manually assess the nature and progression of the attack campaign. This may lead to delays and increase the likelihood that the attacker will succeed in their efforts before proper remediation is applied.

SUMMARY

Methods and systems for detecting attack campaigns on electronic networks are provided. The methods and systems determine whether one or more electronic networks are being subjected to an attack campaign by detecting and analyzing anomalous relationships between entities on the electronic networks, or between at least one entity on the electronic networks and an external entity that is not a part of the electronic networks, or between the electronic networks as a whole and an external entity. The methods and systems generally correlate the anomalous relationships to reduce the total number of alerts that a cybersecurity analyst must address. The methods and systems may enable the detection, identification, and labeling of known and novel attack campaigns. In the case of known attack campaigns, the methods and systems may rapidly identify the attack campaign (e.g., by comparison to the MITRE att&ck framework), allowing cybersecurity analysts to quickly refer to appropriate documentation and apply recommended remediation techniques without delay. Furthermore, the methods and systems may maintain temporal information related to an attack campaign's progression, allowing the ranking and display of active campaigns for cybersecurity analysts. By ranking the campaigns the analyst's attention may be directed to the most immediate and threatening attacks, reducing time-to-remediation and reducing the chance that the attack campaign will be successful.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which comprise a part of this specification, illustrate several embodiments and, together with the description, serve to explain the principles and features of the disclosed embodiments. In the drawings.

DETAILED DESCRIPTION

Figure 1A:
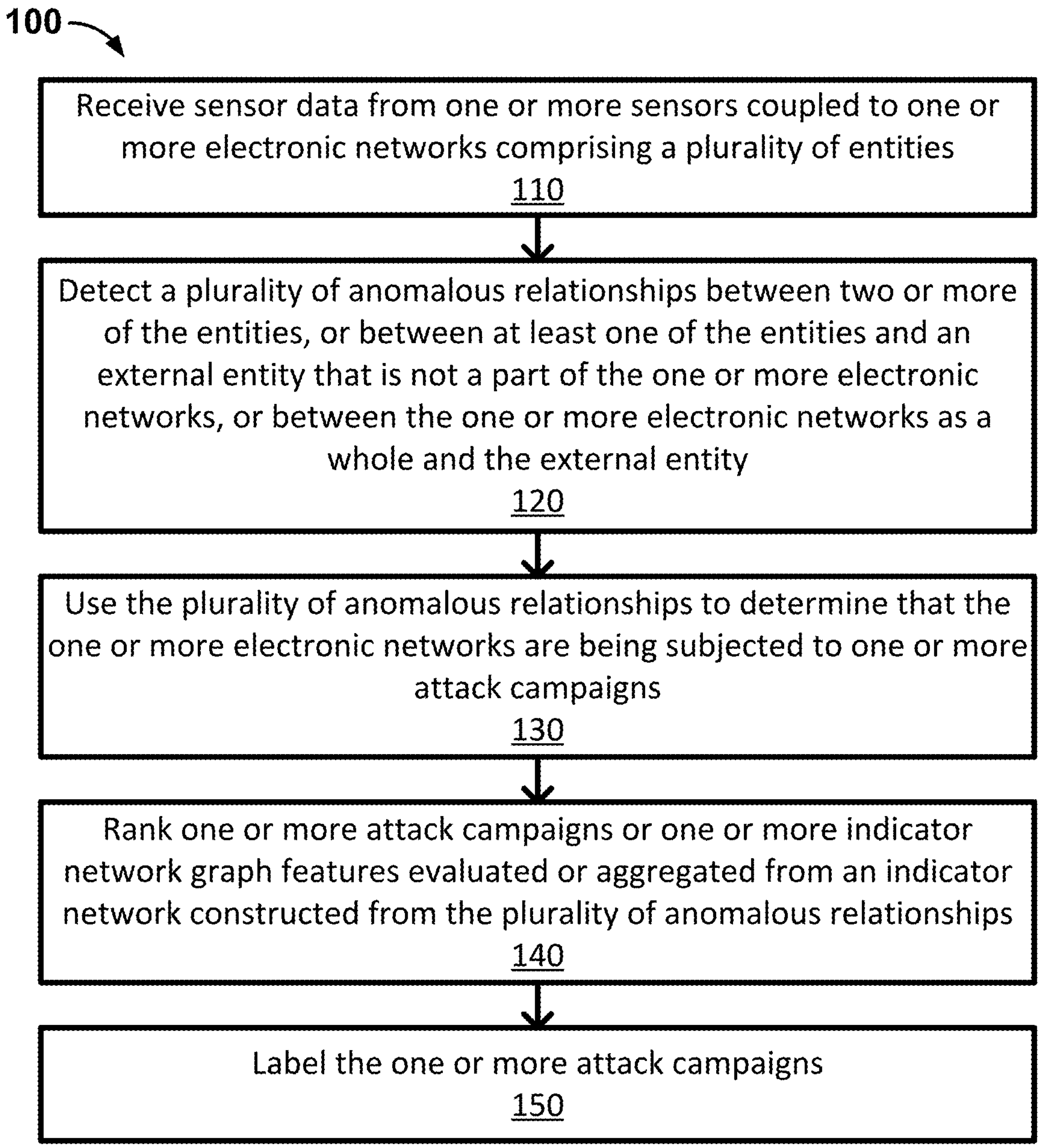
FIG. 1A depicts a first exemplary method for detecting attack campaigns on electronic networks, in accordance with various embodiments, in accordance with various embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Current cybersecurity threat detection systems typically rely on comparing a malicious actor's actions to a catalog of known attack campaigns or the use of machine learning techniques using training sets comprising known attack campaigns. Such reliance on known attack campaigns may make it difficult for current cybersecurity threat detection systems to detect novel attack campaigns.

Additionally, cybersecurity analysts may struggle to manually process the high volume of alerts generated by current threat detection systems, producing false positive alerts that distract from the handling of real attack campaigns. Even when true positives are identified, it can take considerable time and effort to manually assess the nature and progression of the attack campaign. This may lead to delays and increase the likelihood that the attacker will succeed in their efforts before proper remediation is applied.

As such, there is a need for methods and systems that are capable of detecting novel attack campaigns, that reduce the number of false positive alerts presented to cybersecurity analysts, and that present timely and actionable alerts to cybersecurity analysts when a true threat is detected.

The methods and systems described herein determine whether one or more electronic networks are being subjected to an attack campaign by detecting and analyzing anomalous relationships between entities on the electronic networks, or between at least one entity on the electronic networks and an external entity that is not a part of the electronic networks, or between the electronic networks as a whole and an external entity. The methods and systems generally correlate the anomalous relationships to reduce the total number of alerts that a cybersecurity analyst must address. The methods and systems may enable the detection, identification, and labeling of known and novel attack campaigns. In the case of known attack campaigns, the methods and systems may rapidly identify the attack campaign (e.g., by comparison to the MITRE att&ck framework), allowing cybersecurity analysts to quickly refer to appropriate documentation and apply recommended remediation techniques without delay. Furthermore, the methods and systems may maintain temporal information related to an attack campaign's progression, allowing the ranking and display of active campaigns for cybersecurity analysts. By ranking the campaigns the analyst's attention may be directed to the most immediate and threatening attacks, reducing time-to-remediation and reducing the chance that the attack campaign will be successful.

As used herein, unless specifically stated otherwise, the terms "a" and "an" mean "one or more," except where infeasible. Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, both conjunctive and disjunctive, except where infeasible. For example, if it is stated that a component may include A or B, then, unless specifically stated otherwise or infeasible, the component may include A alone, or B alone, or A and B. As a second example, if it is stated that a component may include A, B, or C, then, unless specifically stated otherwise or infeasible, the component may include A alone, or B alone, or C alone, or A and B, or A and C, or B and C, or A and B and C.

As used herein, the phrase "electronic network" includes any network formed from physical devices, such as computers, phones, Internet of Things (IoT) devices, smart home appliances, vehicles, vehicle computers, automobiles, automobile computers, aircraft, aircraft computers, satellites, satellite computers, rockets, rocket computers, other electronic devices, virtual machines, containers, and any other physical devices that are configured to communicate over a shared communications network. Electronic networks may include cloud-based systems, such as those provided by Amazon Web Services (AWS), Microsoft Azure, or Google Cloud Platform (GCP). Generally, electronic networks comprise any networked system where entities communicate through the exchange of bit, bytes, or other information, and upon which malicious actors could cause harm to the electronic network or the organization to whom the electronic network belongs. Communication may constitute any form of information transmission between entities, including bytes, messages, or application programming interface (API) calls.

As used herein, the term "entity" or "entities" includes any component of an electronic network that communicates with any other component of the electronic network. In some cases, entities include any computer component or application that can be access remotely or via the cloud. Entities may include physical or virtual hardware, routers, subnets, internet protocol (IP) addresses, media access control (MAC) addresses, users, services, servers, clients, software, or other applications. For instance, entities may include applications such as the Microsoft 365 software suite or components thereof, the Adobe Creative Suite or components thereof, the Gmail software application, and the like.

As used herein, the term "sensor" or "sensors" includes any physical, electronic, or software tool that records communications traffic (also referred to herein as "sensor data") within an electronic network. For instance, sensors may include logging tools or cloud logging tools, such as Amazon Web Services (AWS) CloudTrail, AWS Flow Logs, Okta Logs, and the like. As another example, sensors may include packet sensors or network metadata sensors.

As used herein, the term "sensor data" (or "communications traffic") includes API calls, communication meta-data, logs, bytes transmitted, messages transmitted, and the like. For example, sensor data may include network packet data, network metadata, user-server interactions, or user-application interactions. The sensor data may be accumulated over time and fed (for instance, via streaming or through a database) into anomaly detection software implemented to perform any of methods 100, 400, 500, and 600 described herein with respect to FIGS. 1, 4, 5, and 6, respectively.

As used herein, the phrase "anomalous relationship" or "anomalous relationships" refers to any relationship between two or more entities on one or more electronic networks, or between at least one entity on the one or more electronic networks and an external entity that is not a part of the one or more electronic networks, or between the one or more electronic networks as a whole and an external entity, that is not expected to occur during normal baseline operation of the one or more electronic networks. Anomalous relationships may comprise all or a portion of an attack campaign. Alternatively, anomalous relationships may represent novel but benign interactions between entities on an electronic networks. For instance, an anomalous relationship may occur when an electronic network is modified by setting up a new service which accepts new connections between entities of the electronic network. This is an example of a benign anomalous relationship. As another example, an anomalous relationship may occur when a new pair of network communications is established between a malicious third party and two trusted entities of an electronic network. This is an example of a malicious anomalous relationship that may occur during a man-in-the-middle attack. As still another example, an anomalous relationship may occur when a new local-to external low frequency signal from malicious software is planted on an entity of an electronic network. This is an example of a malicious anomalous relationship that may occur during the beaconing stage of an attack campaign. As a final example, an anomalous relationship may occur when there is a sudden increase in the amount of electronic data transferred from a local-to-external connection on a port which has previously been unused by an entity of an electronic network. This is an example of a malicious anomalous relationship that may occur during the exfiltration stage of an attack campaign.

FIG. 1A depicts a first exemplary method 100 for detecting attack campaigns on electronic networks, in accordance with various embodiments. In some embodiments, the method 100 is performed using a computing system, such as computing system 700 described herein with respect to FIG. 7.

At step 110, sensor data is received from one or more sensors coupled to one or more electronic networks. In some embodiments, the one or more electronic networks comprise a plurality of entities.

At step 120, a plurality of anomalous relationships are detected between two or more entities of the plurality of entities, or between at least one entity of the plurality of entities and an external entity that is not a part of the one or more electronic networks, or between the one or more electronic networks as a whole and an external entity. In some embodiments, the plurality of anomalous relationships are detected using an anomaly detection algorithm. In general, the anomaly detection algorithm is capable of detecting benign or malicious communication between any two or more of the entities. In some embodiments, the anomaly detection algorithm comprises a machine learning procedure, such as a supervised machine learning procedure trained on a labeled training dataset or an unsupervised machine learning procedure that flags anomalous relationships that deviate from expected norms. In some embodiments, the anomaly detection algorithm comprises a rule-based procedure, such as thresholding, outlier detection, or packet capture (PCAP).

At step 130, the plurality of anomalous relationships are used to determine that the one or more electronic networks are being subjected to one or more attack campaigns. In some embodiments, an alert that the one or more electronic networks are being subjected to an attack campaign is reported. In some embodiments, the alert is reported to a user or cybersecurity analyst of the one or more electronic networks. In some embodiments, the alert is stored. In some embodiments, the alert is stored in a software module. In some embodiments, the software module comprises an analytics module or a data aggregation module. In some embodiments, the alert comprises information regarding how far the attack campaign has progressed. In some embodiments, step 130 comprises the sub-steps 132, 134, 136, and, optionally, 138, depicted in FIG. 1B.

Figure 1B:
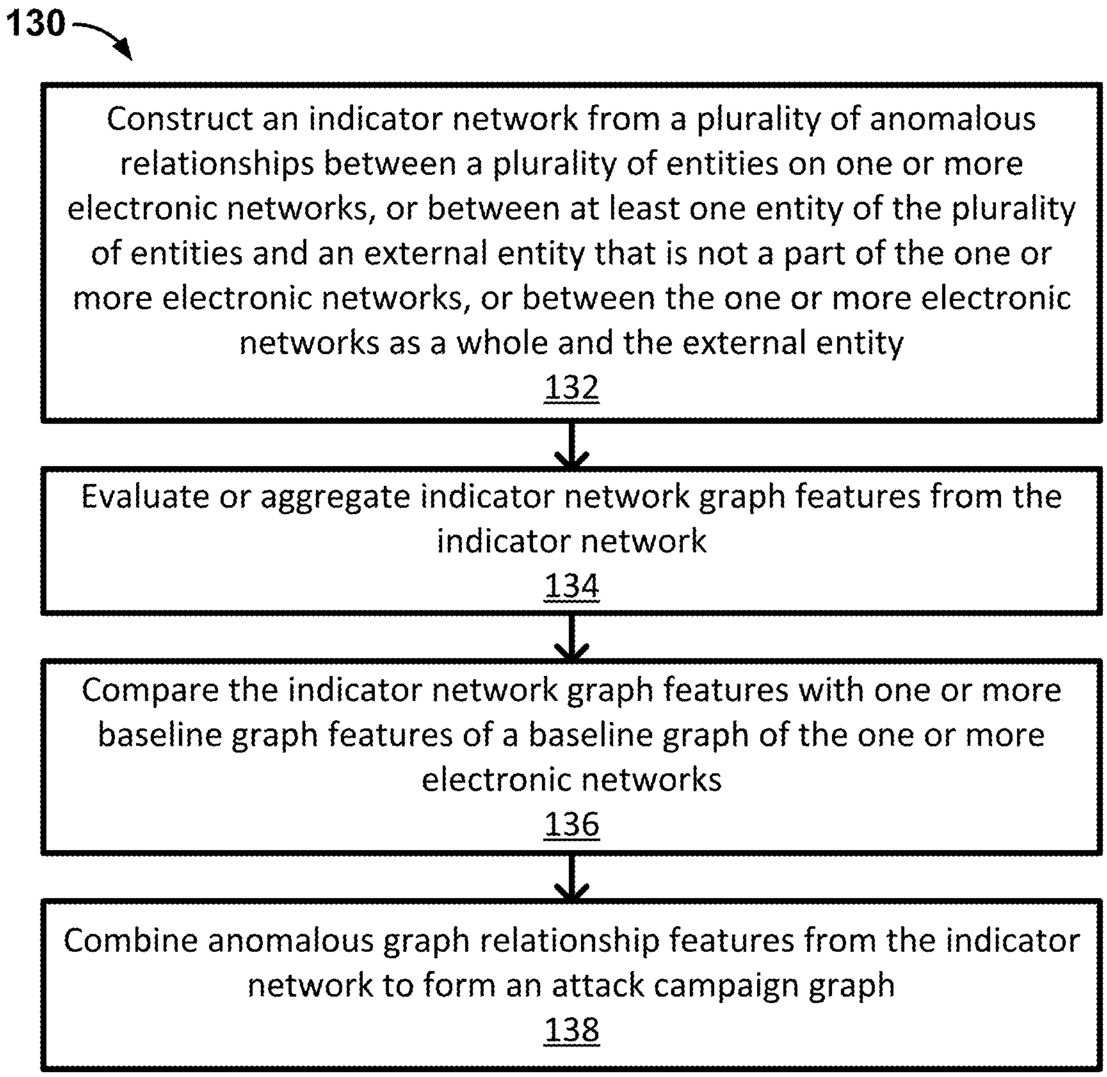
FIG. 1B depicts an exemplary method for using a plurality of anomalous relationships to determine that one or more electronic networks are being subjected to an attack campaign, in accordance with various embodiments.

FIG. 1B depicts an exemplary method 130 for using a plurality of anomalous relationships to determine that one or more electronic networks are being subjected to an attack campaign. In some embodiments, the method 130 is performed using a computing system, such as computing system 700 described herein with respect to FIG. 7.

At step 132, an indicator network is constructed from the plurality of anomalous relationships. In some embodiments, the indicator network comprises a plurality of indicator network subgraphs. In some embodiments, each indicator network subgraph is associated with an anomalous relationship between two or more entities, or between at least one entity on the one or more electronic networks and an external entity that is not a part of the one or more electronic networks, or between the one or more electronic networks as a whole and an external entity. In some embodiments, the indicator network is created from pairs of anomalous communication patterns. In some embodiments, each pair is an edge in the indicator network and comprises two entities and a directed link between the two entities or between the at least one entity on the one or more electronic networks and an external entity that is not a part of the one or more electronic networks. In some embodiments, the directed link contains information about the degree of risk of the corresponding anomalous communication pattern, communication protocol, number of bytes transferred, or the like. In some embodiments, the indicator network comprises a union of the indicator network subgraphs.

Figure 2:
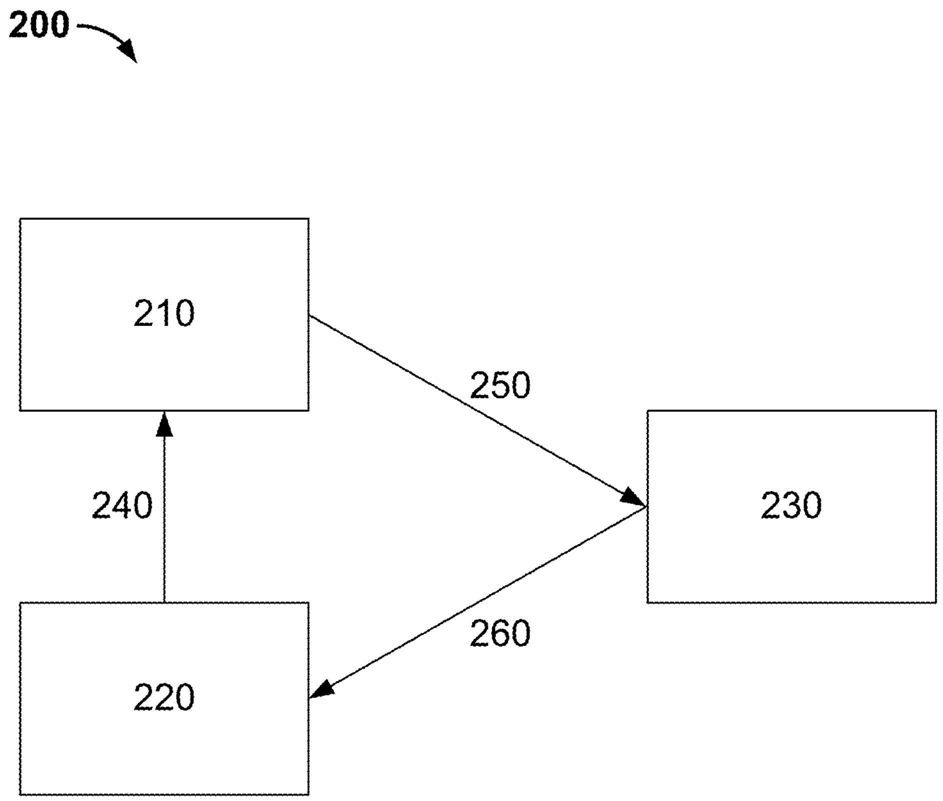
FIG. 2 depicts an exemplary indicator network subgraph, in accordance with various embodiments.

FIG. 2 depicts an exemplary indicator network subgraph 200, in accordance with various embodiments. As shown in FIG. 2, the indicator network subgraph 200 comprises first, second, and third entities 210, 220, and 230, respectively. In the example shown, each entity is associated with a particular IP address. As shown in FIG. 2, the indicator network subgraph 200 further comprises first, second, and third directed links 240, 250, and 260, respectively. In the example shown, the first directed link 240 corresponds to anomalous communications between the first and second entities 210 and 220, respectively, the second directed link 250 corresponds to anomalous communications between the first and third entities 210 and 230, respectively, and the third directed link 260 corresponds to anomalous communications between the second and third entities, respectively. The first, second, and third directed links are associated with weighted scores representing the magnitude of each anomalous communication.

Returning to the description of FIG. 1B, at step 134, indicator network graph features from the indicator network are then evaluated or aggregated. In some embodiments, the indicator network graph features comprise paths, motifs, topological structures, cliques, graph embeddings, or connected components associated with the indicator network. In some embodiments, the indicator network graph features are identified using one or more graph neural networks. In some embodiments, the indicator network graph features are evaluated or aggregated by counting motifs or paths on the indicator network.

At step 136, the indicator network graph features are compared with one or more baseline graph features of a baseline graph of the one or more electronic networks. In some embodiments, it is determined, based on the comparison, that one or more of the indicator network graph features are not indicative of normal electronic network behavior. In some embodiments, the determination is made by counting motifs or graphs on the indicator network or the baseline graph. In some embodiments, an alert that the one or more of the indicator network graph features are not indicative of normal electronic network behavior is reported. In some embodiments, the alert is reported to a user or cybersecurity analyst of the one or more electronic networks. In some embodiments, the alert is stored. In some embodiments, the alert is stored in a software module. In some embodiments, the software module comprises an analytics module or a data aggregation module. In some embodiments, the alert comprises a time-series plot showing the occurrence of one or more of the indicator network graph features over time, an indicator showing departures of the one or more indicator network graph features from the one or more baseline graph features, or annotated information about how to interpret the occurrence of the one or more indicator network graph features. In some embodiments, the baseline graph and the baseline graph features are obtained by permitting the one or more electronic networks to operate in a normal manner for a period of time and monitoring the one or more electronic networks for the period of time to determine normal network behavior. In some embodiments, the period of time occurs before the implementation of method 100, method 130, or of any one or more of steps 110, 120, 130, 132, 134, and 136.

At step 138, anomalous graph relationship graph features from the indicator network are combined to form an attack campaign graph. In some embodiments, the anomalous relationship graph features are combined to reflect a temporal ordering of the anomalous relationship graph features. That is, in some embodiments, the anomalous relationship graph features are combined in the temporal order in which they occurred. In some embodiments, such temporal ordering allows a user or cybersecurity analyst of the one or more electronic networks to visualize the temporal relationships between different actions in the attack campaign, allowing the user or cybersecurity analyst to understand the progression of the attack campaign. In some embodiments, the attack campaign graph is reported. In some embodiments, the attack campaign graph is reported to a user or cybersecurity analyst of the one or more electronic networks.

Figure 3:
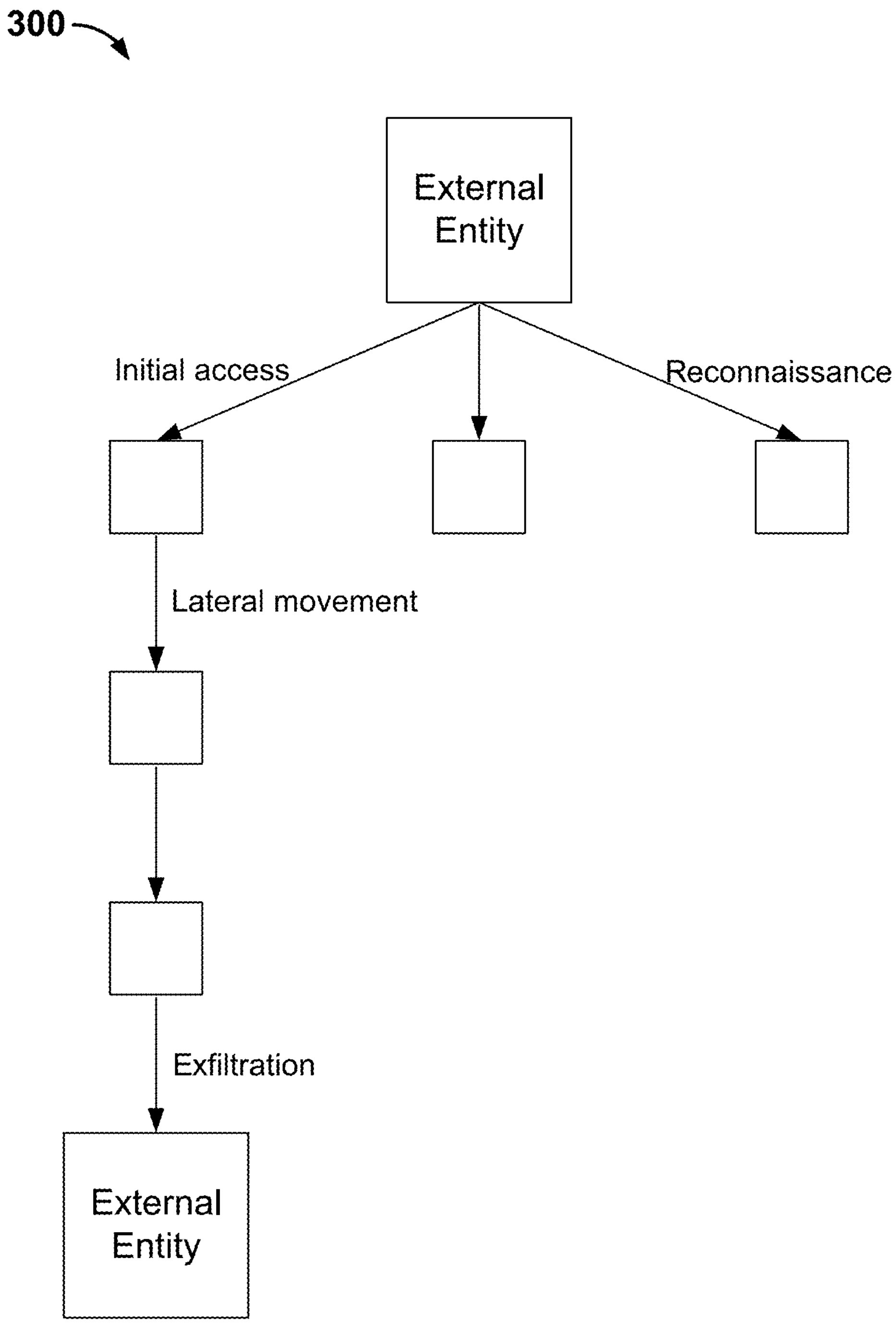
FIG. 3 depicts an exemplary attack campaign graph, in accordance with various embodiments.

FIG. 3 depicts an exemplary attack campaign graph 300, in accordance with various embodiments. As shown in FIG. 3, the attack campaign graph comprises a temporally ordered series of anomalous relationships between entities, or between at least one entity and an external entity that is not a part of the one or more electronic networks, or between the one or more electronic networks as a whole and an external entity, such as reconnaissance of an electronic network by an external entity, initial access to the electronic network by the external entity, lateral movement within the electronic network by the external entity, and exfiltration of data from the electronic network by the external entity.

Returning to the description of FIG. 1A, at step 140, the one or more indicator network graph features or the one or more attack campaigns are ranked. In some embodiments, the one or more indicator network graph features or the one or more attack campaigns are ranked based on an age of each attack campaign, a stage of progression of each attack campaign, or a risk score associated with each attack campaign. For instance, in some embodiments, a weighted mixture of the age, stage of progression, and risk score associated with each attack campaign is calculated for each attack campaign, and the attack campaigns are ranked based on their associated weighted mixtures. In some embodiments, the ranking of the one or more indicator network graph features or the one or more attack campaigns is reported. In some embodiments, the ranking is reported to a user or cybersecurity analyst of the one or more electronic networks. In some embodiments, the ranking of the one or more indicator network graph features or the one or more attack campaigns is displayed. In some embodiments, the ranking is displayed to a user or cybersecurity analyst of the one or more electronic networks.

At step 150, the one or more attack campaigns are labeled. For instance, in some embodiments, the one or more attack campaigns are labeled as known attack campaigns or novel attack campaigns. In some embodiments, the one or more attack campaigns are labeled based on a comparison between the one or more attack campaigns and a database of known attack campaigns (such as the MITRE att&ck database). In some embodiments, a user or cybersecurity analyst of the one or more electronic networks is permitted to label the one or more attack campaigns for inclusion in, for example, a database of known attack campaign. For example, the user or cybersecurity analyst may investigate activity represented by the indicator network, determine that the activity is malicious, and label the attack campaign accordingly. The indicator network and the attack campaign could then be include in a database of known attack campaigns. As another example, the user or cybersecurity analyst may investigate the activity represented by the indicator network, determine that the activity is the result of business operations for standing up a new network cluster and corresponding services, and label the indicator network and the attack campaign as innocuous.

In some embodiments, the method 100, or any one or more of steps 110, 120, 130, 132, 134, 136, 138, 140, and 150, is performed using sensor data from a single electronic network. That is, in some embodiments, the one or more electronic networks comprise a single electronic network and the single electronic network comprises the two or more entities discussed herein. As such, the method 100, or any one or more of steps 110, 120, 130, 132, 134, 136, 138, 140, and 150, may be used to detect anomalous relationships and attack campaigns conducted on a single electronic network.

In some embodiments, the method 100, or any one or more of steps 110, 120, 130, 132, 134, 136, 138, 140, and 150, is performed using sensor data from multiple electronic networks. That is, in some embodiments, the one or more electronic networks comprise a first electronic network and a second electronic network, the first electronic network comprises a first entity of the two or more entities discussed herein, and the second electronic network comprises a second entity of the two or more entities discussed herein. As such, the method 100, or any one or more of steps 110, 120, 130, 132, 134, 136, 138, 140, and 150, may be used to detect anomalous relationships and attack campaigns conducted across multiple electronic networks.

As described in FIG. 1A, the method 100 may be implemented by performing all of steps 110, 120, 130, 140, and 150 on a single computing system. However, the disclosure is not intended to be so limiting. Some steps of the methods described herein may be performed using a first computing system, with other steps of the methods described herein being performed using a second, third, or fourth computing system.

Figure 4:
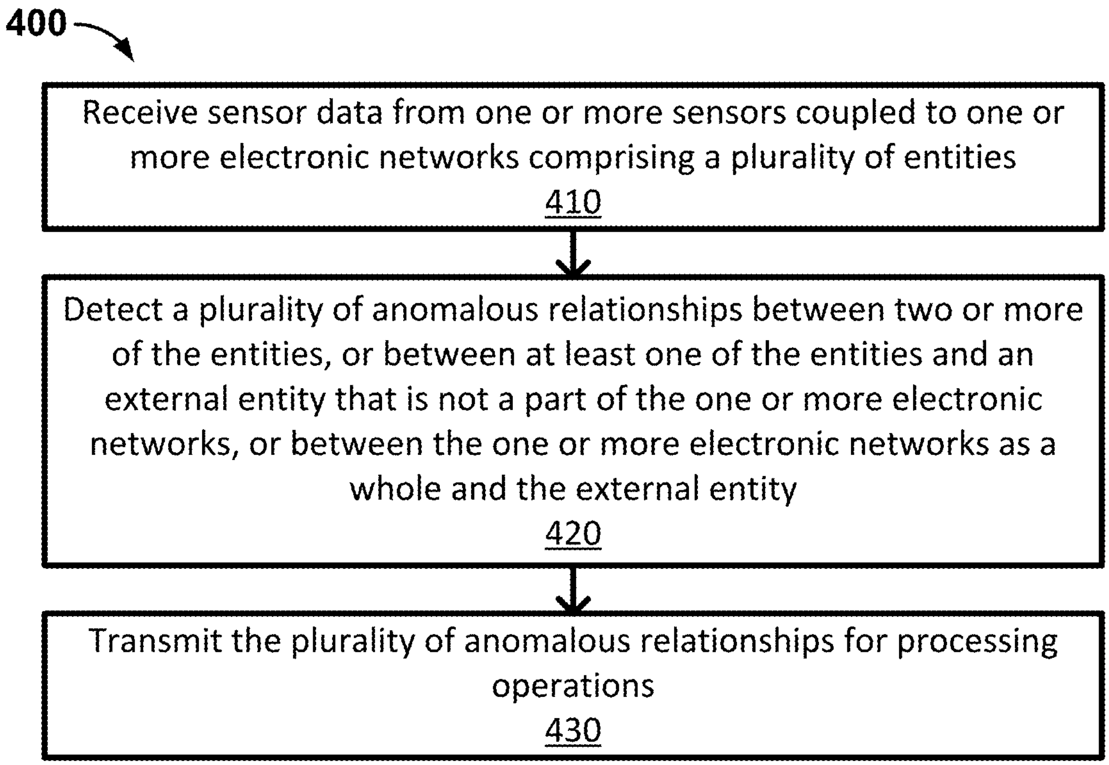
FIG. 4 depicts a second exemplary method for detecting attack campaigns on electronic networks, in accordance with various embodiments, in accordance with various embodiments.

Thus, FIG. 4 depicts a second exemplary method 400 for detecting attack campaigns on electronic networks, in accordance with various embodiments. In some embodiments, the method 400 is performed using a computing system, such as computing system 700 described herein with respect to FIG. 7. In the example shown in FIG. 4, sensing and anomalous relationship detection are performed on a first computing device. The anomalous relationships are then transmitted to a second computing device for further processing operations.

At step 410, sensor data is received from one or more sensors coupled to one or more electronic networks. In some embodiments, the one or more electronic networks comprise a plurality of entities. In some embodiments step 410 is identical to step 110 described herein with respect to FIG. 1A.

At step 420, a plurality of anomalous relationships are detected between two or more entities of the plurality of entities, or between at least one entity of the plurality of entities and an external entity that is not a part of the one or more electronic networks or between the one or more electronic networks as a whole and an external entity. In some embodiments, the plurality of anomalous relationships are detected using an anomaly detection algorithm. In some embodiments, step 420 is identical to step 120 described herein with respect to FIG. 1A.

At step 430, the plurality of anomalous relationships are transmitted (e.g., to a separate computing device) for processing operations. In some embodiments, the processing operations comprise any one or more of steps 130, 132, 134, 136, 138, 140, and 150 described herein with respect to FIGS. 1A and 1B.

In some embodiments, the method 400, or any one or more of steps 410, 420, and 430, is performed using sensor data from a single electronic network. That is, in some embodiments, the one or more electronic networks comprise a single electronic network and the single electronic network comprises the two or more entities discussed herein. As such, the method 400, or any one or more of steps 410, 420, and 430, may be used to detect anomalous relationships and attack campaigns conducted on a single electronic network.

In some embodiments, the method 400, or any one or more of steps 410, 420, and 430, is performed using sensor data from multiple electronic networks. That is, in some embodiments, the one or more electronic networks comprise a first electronic network and a second electronic network, the first electronic network comprises a first entity of the two or more entities discussed herein, and the second electronic network comprises a second entity of the two or more entities discussed herein. As such, the method 400, or any one or more of steps 410, 420, and 430, may be used to detect anomalous relationships and attack campaigns conducted across multiple electronic networks.

Figure 5:
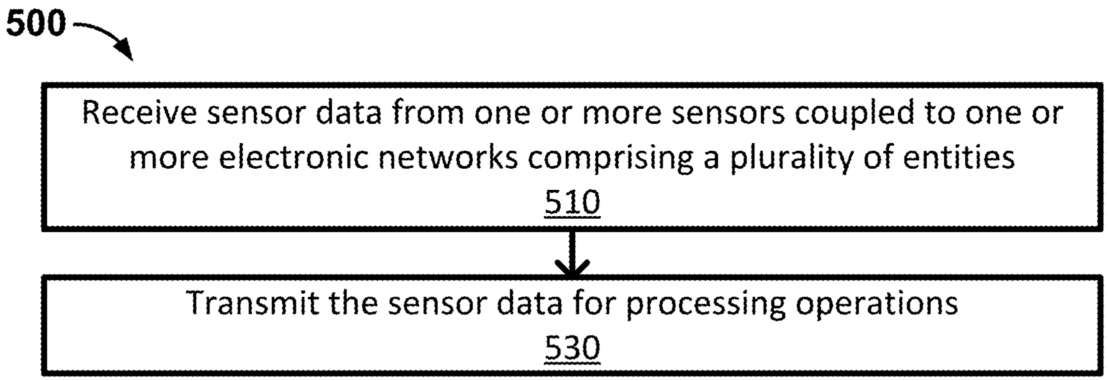
FIG. 5 depicts a third exemplary method for detecting attack campaigns on electronic networks, in accordance with various embodiments, in accordance with various embodiments.

FIG. 5 depicts a third exemplary method 500 for detecting attack campaigns on electronic networks, in accordance with various embodiments. In some embodiments, the method 500 is performed using a computing system, such as computing system 700 described herein with respect to FIG. 7. In the example shown in FIG. 5, sensing is performed on a first computing device. Sensor data from the sensing is then transmitted to a second computing device for further processing operations.

At step 510, sensor data is received from one or more sensors coupled to one or more electronic networks. In some embodiments, the one or more electronic networks comprise a plurality of entities. In some embodiments, step 510 is identical to step 110 described herein with respect to FIG. 1A.

At step 520, the sensor data is transmitted (e.g., to a separate computing device) for processing operations. In some embodiments, the processing operations comprise any one or more of steps 120, 130, 132, 134, 136, 138, 140, and 150 described herein with respect to FIGS. 1A and 1B.

In some embodiments, the method 500, or any one or more of steps 510 and 520, is performed using sensor data from a single electronic network. That is, in some embodiments, the one or more electronic networks comprise a single electronic network and the single electronic network comprises the two or more entities discussed herein. As such, the method 400, or any one or more of steps 510 and 520, may be used to detect anomalous relationships and attack campaigns conducted on a single electronic network.

In some embodiments, the method 500, or any one or more of steps 510 and 520, is performed using sensor data from multiple electronic networks. That is, in some embodiments, the one or more electronic networks comprise a first electronic network and a second electronic network, the first electronic network comprises a first entity of the two or more entities discussed herein, and the second electronic network comprises a second entity of the two or more entities discussed herein. As such, the method 500, or any one or more of steps 510 and 520, may be used to detect anomalous relationships and attack campaigns conducted across multiple electronic networks.

Figure 6:
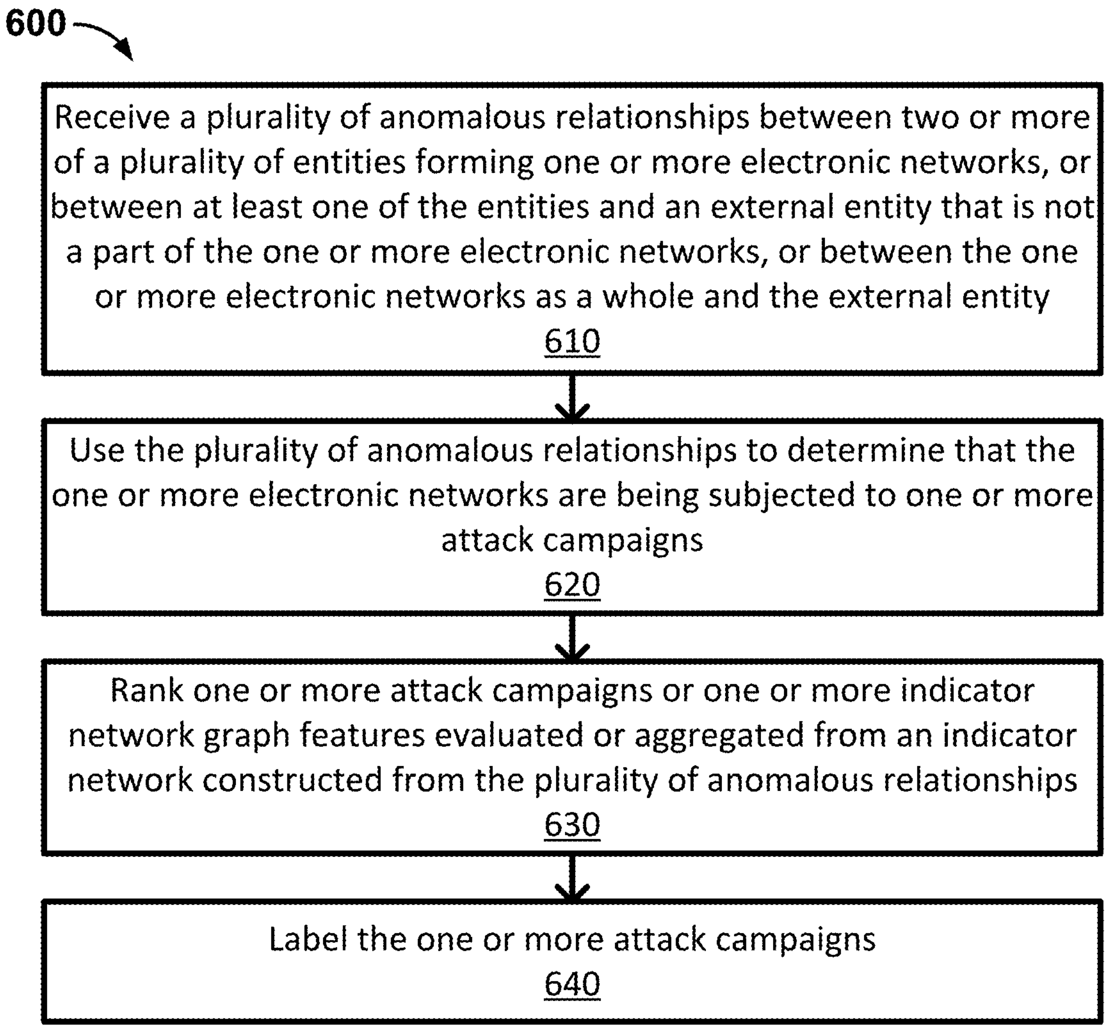
FIG. 6 depicts a fourth exemplary method for detecting attack campaigns on electronic networks, in accordance with various embodiments, in accordance with various embodiments.

FIG. 6 depicts a fourth exemplary method 600 for detecting attack campaigns on electronic networks, in accordance with various embodiments. In some embodiments, the method 600 is performed using a computing system, such as computing system 700 described herein with respect to FIG. 7. In the example shown in FIG. 6, sensing and anomalous relationship detection are performed on a first computing device. The anomalous relationships are then transmitted to a second computing device for determining that one or more electronic networks are being subjected to an attack campaign.

At step 610, a plurality of anomalous relationships between two or more entities, or between at least one entity and an external entity that is not a part of the one or more electronic networks, or between the one or more electronic networks as a whole and an external entity, is received. In some embodiments, the plurality of anomalous relationships were detected, prior to receipt, from sensor data from one or more sensors coupled to one or more electronic networks.

At step 620, the plurality of anomalous relationships are used to determine that the one or more electronic networks are being subjected to one or more attack campaigns. In some embodiments, step 620 is identical to step 130 described herein with respect to FIG. 1A.

At step 630, the one or more indicator network graph features or the one or more attack campaigns are ranked. In some embodiments, step 630 is identical to step 140 described herein with respect to FIG. 1A.

At step 640, the one or more attack campaigns are labeled. For instance, in some embodiments, the one or more attack campaigns are labeled as known attack campaigns or novel attack campaigns. In some embodiments, step 640 is identical to step 150 described herein with respect to FIG. 1A.

In some embodiments, the method 600, or any one or more of steps 610, 620, 630, and 640, is performed on anomalous relationships from a single electronic network. That is, in some embodiments, the one or more electronic networks comprise a single electronic network and the single electronic network comprises the two or more entities discussed herein. As such, the method 600, or any one or more of steps 610, 620, 630, and 640, may be used to detect anomalous relationships and attack campaigns conducted on a single electronic network.

In some embodiments, the method 600, or any one or more of steps 610, 620, 630, and 640, is performed on anomalous relationships from multiple electronic networks.

That is, in some embodiments, the one or more electronic networks comprise a first electronic network and a second electronic network, the first electronic network comprises a first entity of the two or more entities discussed herein, and the second electronic network comprises a second entity of the two or more entities discussed herein. As such, the method 600, or any one or more of steps 610, 620, 630, and 640, may be used to detect anomalous relationships and attack campaigns conducted across multiple electronic networks.

Additionally, systems are disclosed that can be used to perform the method 100 of FIG. 1A, the method 130 of FIG. 1B, the method 400 of FIG. 4, the method 500 of FIG. 5, the method 600 of FIG. 6, or any one or more of steps 110, 120, 130, 132, 134, 136, 138, 140, and 150, or any one or more of steps 410, 420, and 430, or any one or more of steps 510 and 520, or any more of steps 610, 620, 630, and 640. In some embodiments, the systems comprise one or more processors and memory coupled to the one or more processors. In some embodiments, the one or more processors are configured to implement one or more steps of method 100, 130, 400, 500, and/or 600. In some embodiments, the memory is configured to provide the one or more processors with instructions corresponding to the operations of method 100, 130, 400, 500, and/or 600. In some embodiments, the instructions are embodied in a tangible computer readable storage medium.

Figure 7:
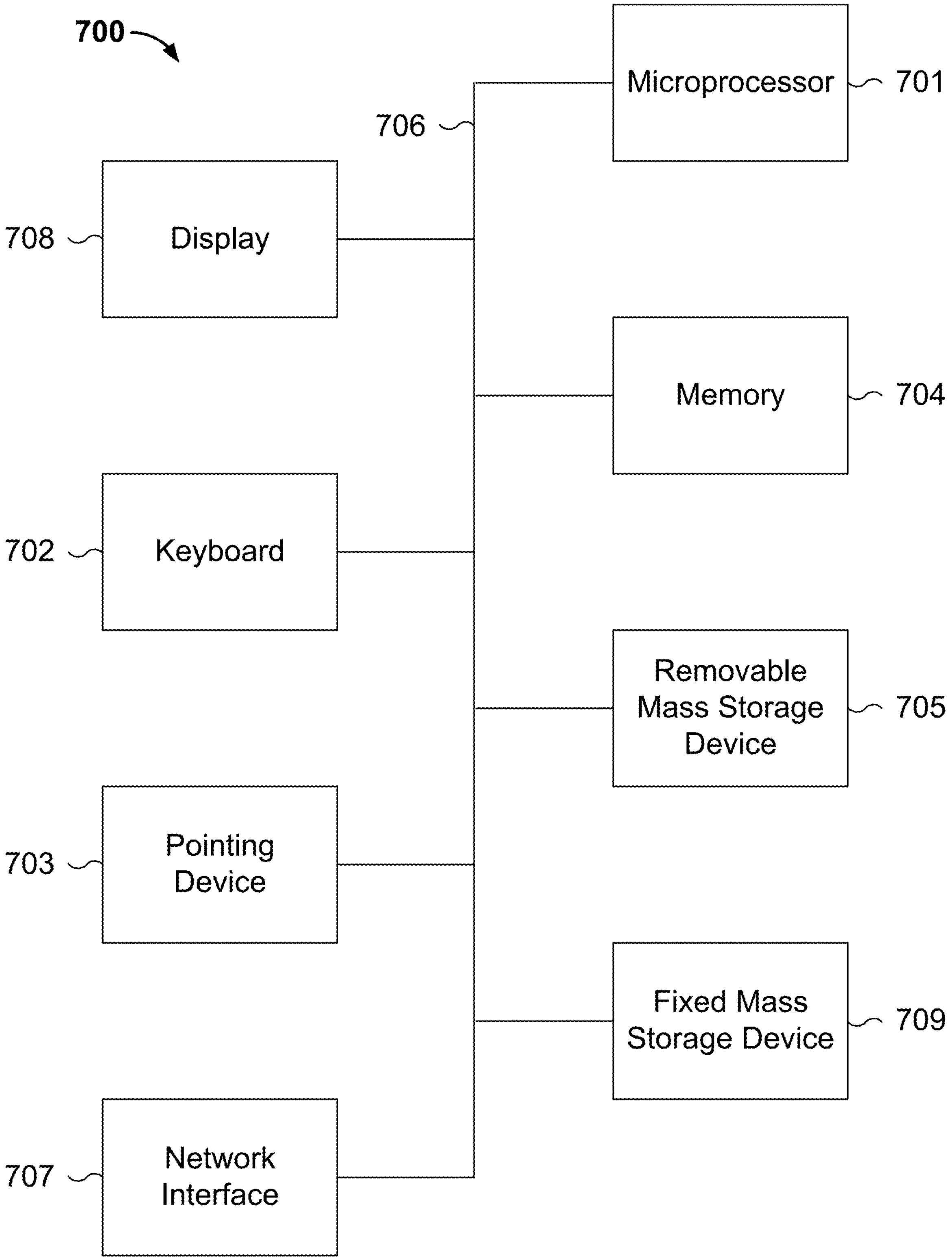
FIG. 7 depicts a block diagram of a computer system used to perform all or portions of the methods described herein with respect to FIGS. 1, 4, 5, and/or 6, in accordance with various embodiments.

FIG. 7 is a block diagram of a computer system 700 used in some embodiments to perform all or portions of methods 100, 130, 400, 500, and/or 600 described herein (such as steps 110, 120, 130, 132, 134, 136, 138 140, and/or 150 of method 100 or 130 as described herein with respect to FIGS. 1A and 1B, steps 410, 420, and/or 430 of method 400 as described herein with respect to FIG. 4, steps 510 and/or 520 of method 500 as described herein with respect to FIG. 5, and/or steps 610, 620, 630, and/or 640 of method 600 as described herein with respect to FIG. 6). In some embodiments, the computer system may be utilized as a component in systems for performing the methods of FIGS. 1A, 1B, 4, 5, and/or 6 described herein. FIG. 7 illustrates one embodiment of a general purpose computer system. Other computer system architectures and configurations can be used for carrying out the processing of the present invention. Computer system 700, made up of various subsystems described below, includes at least one microprocessor subsystem 701. In some embodiments, the microprocessor subsystem comprises at least one central processing unit (CPU) or graphical processing unit (GPU). The microprocessor subsystem can be implemented by a single-chip processor or by multiple processors. In some embodiments, the microprocessor subsystem is a general purpose digital processor which controls the operation of the computer system 700. Using instructions retrieved from memory 704, the microprocessor subsystem controls the reception and manipulation of input data, and the output and display of data on output devices.

The microprocessor subsystem 701 is coupled bi-directionally with memory 704, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on microprocessor subsystem. Also as well known in the art, primary storage typically includes basic operating instructions, program code, data and objects used by the microprocessor subsystem to perform its functions. Primary storage devices 704 may include any suitable computer-readable storage media, described below, depending on whether, for example, data access needs to be bi-directional or uni-directional. The microprocessor subsystem 701 can also directly and very rapidly retrieve and store frequently needed data in a cache memory (not shown).

A removable mass storage device 705 provides additional data storage capacity for the computer system 700, and is coupled either bi-directionally (read/write) or uni-directionally (read only) to microprocessor subsystem 701. Storage 705 may also include computer-readable media such as magnetic tape, flash memory, signals embodied on a carrier wave, PC-CARDS, portable mass storage devices, holographic storage devices, and other storage devices. A fixed mass storage 709 can also provide additional data storage capacity. The most common example of mass storage 709 is a hard disk drive. Mass storage 705 and 709 generally store additional programming instructions, data, and the like that typically are not in active use by the processing subsystem. It will be appreciated that the information retained within mass storage 705 and 709 may be incorporated, if needed, in standard fashion as part of primary storage 704 (e.g. RAM) as virtual memory.

In addition to providing processing subsystem 701 access to storage subsystems, bus 706 can be used to provide access other subsystems and devices as well. In the described embodiment, these can include a display monitor 708, a network interface 707, a keyboard 702, and a pointing device 703, as well as an auxiliary input/output device interface, a sound card, speakers, and other subsystems as needed. The pointing device 703 may be a mouse, stylus, track ball, or tablet, and is useful for interacting with a graphical user interface.

The network interface 707 allows the processing subsystem 701 to be coupled to another computer, computer network, or telecommunications network using a network connection as shown. Through the network interface 707, it is contemplated that the processing subsystem 701 might receive information, e.g., data objects or program instructions, from another network, or might output information to another network in the course of performing the above-described method steps. Information, often represented as a sequence of instructions to be executed on a processing subsystem, may be received from and outputted to another network, for example, in the form of a computer data signal embodied in a carrier wave. An interface card or similar device and appropriate software implemented by processing subsystem 701 can be used to connect the computer system 700 to an external network and transfer data according to standard protocols. That is, method embodiments of the present invention may execute solely upon processing subsystem 701, or may be performed across a network such as the Internet, intranet networks, or local area networks, in conjunction with a remote processing subsystem that shares a portion of the processing. Additional mass storage devices (not shown) may also be connected to processing subsystem 701 through network interface 707.

An auxiliary I/O device interface (not shown) can be used in conjunction with computer system 700. The auxiliary I/O device interface can include general and customized interfaces that allow the processing subsystem 701 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contains program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter. The computer system shown in FIG. 7 is but an example of a computer system suitable for use with the invention. Other computer systems suitable for use with the invention may include additional or fewer subsystems. In addition, bus 706 is illustrative of any interconnection scheme serving to link the subsystems. Other computer architectures having different configurations of subsystems may also be utilized.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure.

RECITATION OF EMBODIMENTS

Embodiment 1. A method comprising:

a. receiving sensor data from one or more sensors coupled to one or more electronic networks, the one or more electronic networks comprising a plurality of entities;

b. detecting, from the sensor data, a plurality of anomalous relationships between two or more entities of the plurality of entities, or between at least one entity of the plurality of entities and an external entity that is not a part of the one or more electronic networks, or between the one or more electronic networks as a whole and the external entity; and c. determining, based on the plurality of anomalous relationships, that the one or more electronic networks are being subjected to one or more attack campaigns.

Embodiment 2. The method of Embodiment 1, further comprising reporting an alert that one or more electronic networks are being subjected to an attack campaign or storing the alert in an analytics module or a data aggregation module.

Embodiment 3. The method of Embodiment 1 or 2, wherein (c) comprises:

i. constructing an indicator network from the plurality of anomalous relationships;

ii. evaluating or aggregating indicator network graph features from the indicator network; and iii. determining, by comparing the indicator network graph features with one or more baseline graph features of a baseline graph of the one or more electronic networks, that one or more of the indicator network graph features are not indicative of normal electronic network behavior.

Embodiment 4. The method of Embodiment 3, further comprising reporting an alert that the one or more of the indicator network graph features are not indicative of normal electronic network behavior or storing the alert in an analytics module or a data aggregation module.

Embodiment 5. The method of Embodiment 4, wherein the alert comprises a time-series plot showing the occurrence of one or more of the indicator network graph features over time, an indicator showing departures of the one or more indicator network graph features from the one or more baseline graph features, or annotated information about how to interpret the occurrence of the one or more indicator network graph features.

Embodiment 6. The method of any one of Embodiments 3-5, wherein the indicator network comprises a plurality of indicator network subgraphs, each indicator network subgraph associated with an anomalous relationship between two or more entities of the plurality of entities, or between at least one entity of the plurality of entities and an external entity that is not a part of the one or more electronic networks, or between the one or more electronic networks as a whole and the external entity.

Embodiment 7. The method of any one of Embodiments 3-6, wherein the indicator network graph features comprise paths, motifs, topological structures, cliques, graph embeddings, or connected components associated with the indicator network, or wherein the indicator network graph features are identified using one or more graph neural networks.

Embodiment 8. The method of any one of Embodiments 3-7, wherein (ii) or (iii) comprises counting motifs or paths on the indicator network or the baseline graph.

Embodiment 9. The method of any one of Embodiments 3-8, wherein (c) further comprises:

iv. combining anomalous relationship graph features from the indicator network to thereby form an attack campaign graph.

Embodiment 10. The method of Embodiment 9, wherein (iv) comprises combining the anomalous relationship graph features to reflect a temporal ordering of the anomalous relationship graph features.

Embodiment 11. The method of Embodiment 9 or 10, further comprising reporting the attack campaign graph.

Embodiment 12. The method of any one of Embodiments 1-11, further comprising:

d. ranking the one or more indicator network graph features or the one or more attack campaigns.

Embodiment 13. The method of Embodiment 12, further comprising displaying the ranking of the one or more indicator network graph features or the one or more attack campaigns.

Embodiment 14. The method of Embodiment 12 or 13, wherein (d) comprises ranking the one or more indicator network graph features or the one or more attack campaigns based on an age of each attack campaign, a stage of progression of each attack campaign, or a risk score associated with each attack campaign.

Embodiment 15. The method of any one of Embodiments 12-14, wherein (d) comprises, for each attack campaign, determining a weighted mixture of the age of each attack campaign, the stage of progression of each attack campaign, and the risk score associated with each attack campaign, and ranking each attacked campaign based on each weighted mixture.

Embodiment 16. The method of any one of Embodiments 12-15, further comprising reporting the ranking of the one or more indicator network graph features or the one or more attack campaigns.

Embodiment 17. The method of any one of Embodiments 1-16, further comprising labeling the one or more attack campaigns as one or more known attack campaigns or one or more novel attack campaigns based on a comparison between the one or more attack campaigns and a database of known attack campaigns.

Embodiment 18. The method of any one of Embodiments 1-17, further comprising permitting a user or analyst of the one or more electronic networks to label the one or more attack campaigns.

Embodiment 19. The method of any one of Embodiments 1-18, wherein the one or more electronic networks comprise a single electronic network and wherein the single electronic network comprises the two or more entities.

Embodiment 20. The method of any one of Embodiments 1-18, wherein the one or more electronic networks comprise at least a first electronic network and a second electronic network, wherein the first electronic network comprises a first entity of the at least two entities, and wherein the second electronic network comprises a second entity of the at least two entities.

Embodiment 21. A method comprising:

a. receiving sensor data from one or more sensors coupled to one or more electronic networks, the one or more electronic networks comprising a plurality of entities;

b. detecting, from the sensor data, a plurality of anomalous relationships between two or more entities of the plurality of entities, or between at least one entity of the plurality of entities and an external entity that is not a part of the one or more electronic networks, or between the one or more electronic networks as a whole and the external entity; and c. transmitting the plurality of anomalous relationships for processing operations comprising:

i. determining, based on the plurality of anomalous relationships, that the one or more electronic networks are being subjected to one or more attack campaigns.

Embodiment 22. The method of Embodiment 21, wherein (i) comprises:

1. constructing an indicator network from the plurality of anomalous relationships;
2. evaluating or aggregating indicator network graph features from the indicator network; and
3. determining, by comparing the indicator network graph features with one or more baseline graph features of a baseline graph of the one or more electronic networks, that one or more of the indicator network graph features are not indicative of normal electronic network behavior.

Embodiment 23. The method of Embodiment 22, wherein the indicator network comprises a plurality of indicator network subgraphs, each indicator network subgraph associated with an anomalous relationship between two or more entities of the plurality of entities, or between at least one entity of the plurality of entities and an external entity that is not a part of the one or more electronic networks, or between the one or more electronic networks as a whole and the external entity.

Embodiment 24. The method of Embodiment 22 or 23, wherein the indicator network graph features comprise paths, motifs, topological structures, cliques, graph embeddings, or connected components associated with the indicator network, or wherein the indicator network graph features are identified using one or more graph neural networks.

Embodiment 25. The method of any one of Embodiments 22-24, wherein (2) or (3) comprises counting motifs or paths on the indicator network or the baseline graph.

Embodiment 26. The method of any one of Embodiments 22-25, wherein (i) further comprises:

4. combining anomalous relationship graph features from the indicator network to thereby form an attack campaign graph.

Embodiment 27. The method of Embodiment 26, wherein (4) comprises combining the anomalous relationship graph features to reflect a temporal ordering of the anomalous relationship graph features.

Embodiment 28. The method of any one of Embodiments 21-27, wherein the processing operations further comprise:

ii. ranking the one or more indicator network graph features or the one or more attack campaigns.

Embodiment 29. The method of Embodiment 28, wherein (ii) comprises ranking the one or more indicator network graph features or the one or more attack campaigns based on an age of each attack campaign, a stage of progression of each attack campaign, or a risk score associated with each attack campaign.

Embodiment 30. The method of Embodiment 28 or 29, wherein (ii) comprises, for each attack campaign, determining a weighted mixture of the age of each attack campaign, the stage of progression of each attack campaign, and the risk score associated with each attack campaign, and ranking each attacked campaign based on each weighted mixture.

Embodiment 31. The method of any one of Embodiments 21-30, wherein the one or more electronic networks comprise a single electronic network and wherein the single electronic network comprises the two or more entities.

Embodiment 32. The method of any one of Embodiments 21-30, wherein the one or more electronic networks comprise at least a first electronic network and a second electronic network, wherein the first electronic network comprises a first entity of the at least two entities, and wherein the second electronic network comprises a second entity of the at least two entities.

Embodiment 33. A method comprising:

a. receiving sensor data from one or more sensors coupled to one or more electronic networks, the one or more electronic networks comprising a plurality of entities; and
b. transmitting the sensor data for processing operations comprising:
   i. detecting, from the sensor data, a plurality of anomalous relationships between two or more entities of the plurality of entities, or between at least one entity of the plurality of entities and an external entity that is not a part of the one or more electronic networks, or between the one or more electronic networks as a whole and the external entity; and
   ii. determining, based on the plurality of anomalous relationships, that the one or more electronic networks are being subjected to one or more attack campaigns.

Embodiment 34. The method of Embodiment 33, wherein (ii) comprises:

1. constructing an indicator network from the plurality of anomalous relationships;
2. evaluating or aggregating indicator network graph features from the indicator network; and
3. determining, by comparing the indicator network graph features with one or more baseline graph features of a baseline graph of the one or more electronic networks, that one or more of the indicator network graph features are not indicative of normal electronic network behavior.

Embodiment 35. The method of Embodiment 34, wherein the indicator network comprises a plurality of indicator network subgraphs, each indicator network subgraph associated with an anomalous relationship between two or more entities of the plurality of entities, or between at least one entity of the plurality of entities and an external entity that is not a part of the one or more electronic networks, or between the one or more electronic networks as a whole and the external entity.

Embodiment 36. The method of Embodiment 34 or 35, wherein the indicator network graph features comprise paths, motifs, topological structures, cliques, graph embeddings, or connected components associated with the indicator network, or wherein the indicator network graph features are identified using one or more graph neural networks.

Embodiment 37. The method of any one of Embodiments 34-36, wherein (2) or (3) comprises counting motifs or paths on the indicator network or the baseline graph.

Embodiment 38. The method of any one of Embodiments 34-37, wherein (ii) further comprises:

4. combining anomalous relationship graph features from the indicator network to thereby form an attack campaign graph.

Embodiment 39. The method of Embodiment 38, wherein (4) comprises combining the anomalous relationship graph features to reflect a temporal ordering of the anomalous relationship graph features.

Embodiment 40. The method of any one of Embodiments 33-39, wherein the processing operations further comprise:

iii. ranking the one or more indicator network graph features or the one or more attack campaigns.

Embodiment 41. The method of Embodiment 40, wherein (iii) comprises ranking the one or more indicator network graph features or the one or more attack campaigns based on an age of each attack campaign, a stage of progression of each attack campaign, or a risk score associated with each attack campaign.

Embodiment 42. The method of Embodiment 40 or 41, wherein (iii) comprises, for each attack campaign, determining a weighted mixture of the age of each attack campaign, the stage of progression of each attack campaign, and the risk score associated with each attack campaign, and ranking each attacked campaign based on each weighted mixture.

Embodiment 43. The method of any one of Embodiments 33-42, wherein the one or more electronic networks comprise a single electronic network and wherein the single electronic network comprises the two or more entities.

Embodiment 44. The method of any one of Embodiments 33-42, wherein the one or more electronic networks comprise at least a first electronic network and a second electronic network, wherein the first electronic network comprises a first entity of the at least two entities, and wherein the second electronic network comprises a second entity of the at least two entities.

Embodiment 45. A method comprising:

a. receiving a plurality of anomalous relationships between two or more entities of a plurality of entities, the plurality of entities forming one or more electronic networks, or between at least one entity of the plurality of entities and an external entity that is not a part of the one or more electronic networks, or between the one or more electronic networks as a whole and the external entity, the plurality of anomalous relationships detected from sensor data from one or more sensors coupled to the one or more electronic networks; and
b. determining, based on the plurality of anomalous relationships, that the one or more electronic networks are being subjected to one or more attack campaigns.

Embodiment 46. The method of Embodiment 45, further comprising reporting an alert that the one or more electronic networks are being subjected to an attack campaign or storing the alert in an analytics module or a data aggregation module.

Embodiment 47. The method of Embodiment 45 or 46, wherein (b) comprises:

i. constructing an indicator network from the plurality of anomalous relationships;
ii. evaluating or aggregating indicator network graph features from the indicator network; and
iii. determining, by comparing the indicator network graph features with one or more baseline graph features of a baseline graph of the one or more electronic networks, that one or more of the indicator network graph features are not indicative of normal electronic network behavior.

Embodiment 48. The method of Embodiment 47, further comprising reporting an alert that the one or more of the indicator network graph features are not indicative of normal electronic network behavior or storing the alert in an analytics module or a data aggregation module.

Embodiment 49. The method of Embodiment 48, wherein the alert comprises a time-series plot showing the occurrence of one or more of the indicator network graph features over time, an indicator showing departures of the one or more indicator network graph features from the one or more baseline graph features, or annotated information about how to interpret the occurrence of the one or more indicator network graph features.

Embodiment 50. The method of any one of Embodiments 47-49, wherein the indicator network comprises a plurality of indicator network subgraphs, each indicator network subgraph associated with an anomalous relationship between two or more entities of the plurality of entities, or between at least one entity of the plurality of entities and an external entity that is not a part of the one or more electronic networks, or between the one or more electronic networks as a whole and the external entity.

Embodiment 51. The method of any one of Embodiments 47-50, wherein the indicator network graph features comprise paths, motifs, topological structures, cliques, graph embeddings, or connected components associated with the indicator network, or wherein the indicator network graph features are identified using one or more graph neural networks.

Embodiment 52. The method of any one of Embodiments 47-51, wherein (ii) or (iii) comprises counting motifs or paths on the indicator network or the baseline graph.

Embodiment 53. The method of any one of Embodiments 47-52, wherein (b) further comprises:

iv. combining anomalous relationship graph features from the indicator network to thereby form an attack campaign graph.

Embodiment 54. The method of Embodiment 53, wherein (iv) comprises combining the anomalous relationship graph features to reflect a temporal ordering of the anomalous relationship graph features.

Embodiment 55. The method of Embodiment 53 or 54, further comprising reporting the attack campaign graph.

Embodiment 56. The method of any one of Embodiments 45-55, further comprising:

c. ranking the one or more indicator network graph features or the one or more attack campaigns.

Embodiment 57. The method of Embodiment 56, further comprising displaying the ranking of the one or more indicator network graph features or the one or more attack campaigns.

Embodiment 58. The method of Embodiment 56 or 57, wherein (c) comprises ranking the one or more indicator network graph features or the one or more attack campaigns based on an age of each attack campaign, a stage of progression of each attack campaign, or a risk score associated with each attack campaign.

Embodiment 59. The method of any one of Embodiments 56-58, wherein (c) comprises, for each attack campaign, determining a weighted mixture of the age of each attack campaign, the stage of progression of each attack campaign, and the risk score associated with each attack campaign, and ranking each attacked campaign based on each weighted mixture.

Embodiment 60. The method of any one of Embodiments 56-59, further comprising reporting the ranking of the one or more indicator network graph features or the one or more attack campaigns.

Embodiment 61. The method of any one of Embodiments 45-60, further comprising labeling the one or more attack campaigns as one or more known attack campaigns or one or more novel attack campaigns based on a comparison between the one or more attack campaigns and a database of known attack campaigns.

Embodiment 62. The method of any one of Embodiments 45-61, further comprising permitting a user or analyst of the one or more electronic networks to label the one or more attack campaigns.

Embodiment 63. The method of any one of Embodiments 45-62, wherein the one or more electronic networks comprise a single electronic network and wherein the single electronic network comprises the two or more entities.

Embodiment 64. The method of any one of Embodiments 45-62, wherein the one or more electronic networks comprise at least a first electronic network and a second electronic network, wherein the first electronic network comprises a first entity of the at least two entities, and wherein the second electronic network comprises a second entity of the at least two entities.

Embodiment 65. A computing system configured to implement a method comprising:

a. receiving sensor data from one or more sensors coupled to one or more electronic networks, the one or more electronic networks comprising a plurality of entities;

b. detecting, from the sensor data, a plurality of anomalous relationships between two or more entities of the plurality of entities, or between at least one entity of the plurality of entities and an external entity that is not a part of the one or more electronic networks, or between the one or more electronic networks as a whole and the external entity; and c. determining, based on the plurality of anomalous relationships, that the one or more electronic networks are being subjected to one or more attack campaigns.

Embodiment 66. The computing system of Embodiment 65, wherein the method further comprises reporting an alert that the one or more electronic networks are being subjected to an attack campaign or storing the alert in an analytics module or a data aggregation module.

Embodiment 67. The computing system of Embodiment 65 or 66, wherein (c) comprises:

i. constructing an indicator network from the plurality of anomalous relationships;

ii. evaluating or aggregating indicator network graph features from the indicator network; and iii. determining, by comparing the indicator network graph features with one or more baseline graph features of a baseline graph of the one or more electronic networks, that one or more of the indicator network graph features are not indicative of normal electronic network behavior.

Embodiment 68. The computing system of Embodiment 67, wherein the method further comprises reporting an alert that the one or more of the indicator network graph features are not indicative of normal electronic network behavior or storing the alert in an analytics module or a data aggregation module.

Embodiment 69. The computing system of Embodiment 68, wherein the alert comprises a time-series plot showing the occurrence of one or more of the indicator network graph features over time, an indicator showing departures of the one or more indicator network graph features from the one or more baseline graph features, or annotated information about how to interpret the occurrence of the one or more indicator network graph features.

Embodiment 70. The computing system of any one of Embodiments 67-69, wherein the indicator network comprises a plurality of indicator network subgraphs, each indicator network subgraph associated with an anomalous relationship between two or more entities of the plurality of entities, or between at least one entity of the plurality of entities and an external entity that is not a part of the one or more electronic networks, or between the one or more electronic networks as a whole and the external entity.

Embodiment 71. The computing system of any one of Embodiments 67-70, wherein the indicator network graph features comprise paths, motifs, topological structures, cliques, graph embeddings, or connected components associated with the indicator network, or wherein the indicator network graph features are identified using one or more graph neural networks.

Embodiment 72. The computing system of any one of Embodiments 67-71, wherein (ii) or (iii) comprises counting motifs or paths on the indicator network or the baseline graph.

Embodiment 73. The computing system of any one of Embodiments 67-72, wherein (c) further comprises:

iv. combining anomalous relationship graph features from the indicator network to thereby form an attack campaign graph.

Embodiment 74. The computing system of Embodiment 73, wherein (iv) comprises combining the anomalous relationship graph features to reflect a temporal ordering of the anomalous relationship graph features.

Embodiment 75. The computing system of Embodiment 73 or 74, wherein the method further comprises reporting the attack campaign graph.

Embodiment 76. The computing system of any one of Embodiments 65-75, wherein the method further comprises:

d. ranking the one or more indicator graphs features or the one or more attack campaigns.

Embodiment 77. The computing system of Embodiment 76, wherein the method further comprises displaying the ranking of the one or more indicator network graph features or the one or more attack campaigns.

Embodiment 78. The computing system of Embodiment 76 or 77, wherein (d) comprises ranking the one or more indicator network graph features or the one or more attack campaigns based on an age of each attack campaign, a stage of progression of each attack campaign, or a risk score associated with each attack campaign.

Embodiment 79. The computing system of any one of Embodiments 76-78, wherein (d) comprises, for each attack campaign, determining a weighted mixture of the age of each attack campaign, the stage of progression of each attack campaign, and the risk score associated with each attack campaign, and ranking each attacked campaign based on each weighted mixture.

Embodiment 80. The computing system of any one of Embodiments 76-79, wherein the method further comprises reporting the ranking of the one or more indicator network graph features or the one or more attack campaigns.

Embodiment 81. The computing system of any one of Embodiments 65-80, wherein the method further comprises labeling the one or more attack campaigns as one or more known attack campaigns or one or more novel attack campaigns based on a comparison between the one or more attack campaigns and a database of known attack campaigns.

Embodiment 82. The computing system of any one of Embodiments 65-81, wherein the method further comprises permitting a user or analyst of the one or more electronic networks to label the one or more attack campaigns.

Embodiment 83. The computing system of any one of Embodiments 65-82, wherein the one or more electronic networks comprise a single electronic network and wherein the single electronic network comprises the two or more entities.

Embodiment 84. The computing system of any one of Embodiments 65-82, wherein the one or more electronic networks comprise at least a first electronic network and a second electronic network, wherein the first electronic network comprises a first entity of the at least two entities, and wherein the second electronic network comprises a second entity of the at least two entities.

Embodiment 85. A computing system configured to implement a method comprising:

a. receiving sensor data from one or more sensors coupled to one or more electronic networks, the one or more electronic networks comprising a plurality of entities;

b. detecting, from the sensor data, a plurality of anomalous relationships between two or more entities of the plurality of entities, or between at least one entity of the plurality of entities and an external entity that is not a part of the one or more electronic networks, or between the one or more electronic networks as a whole and the external entity; and c. transmitting the plurality of anomalous relationships for processing operations comprising:

i. determining, based on the plurality of anomalous relationships, that the one or more electronic networks are being subjected to one or more attack campaigns.

Embodiment 86. The computing system of Embodiment 85, wherein (i) comprises:

1. constructing an indicator network from the plurality of anomalous relationships;
2. evaluating or aggregating indicator network graph features from the indicator network; and
3. determining, by comparing the indicator network graph features with one or more baseline graph features of a baseline graph of the one or more electronic networks, that one or more of the indicator network graph features are not indicative of normal electronic network behavior.

Embodiment 87. The computing system of Embodiment 86, wherein the indicator network comprises a plurality of indicator network subgraphs, each indicator network subgraph associated with an anomalous relationship between two or more entities of the plurality of entities, or between at least one entity of the plurality of entities and an external entity that is not a part of the one or more electronic networks, or between the one or more electronic networks as a whole and the external entity.

Embodiment 88. The computing system of Embodiment 86 or 87, wherein the indicator network graph features comprise paths, motifs, topological structures, cliques, graph embeddings, or connected components associated with the indicator network, or wherein the indicator network graph features are identified using one or more graph neural networks.

Embodiment 89. The computing system of any one of Embodiments 86-88, wherein (2) or (3) comprises counting motifs or paths on the indicator network or the baseline graph.

Embodiment 90. The computing system of any one of Embodiments 86-89, wherein (i) further comprises:

4. combining anomalous relationship graph features from the indicator network to thereby form an attack campaign graph.

Embodiment 91. The computing system of Embodiment 90, wherein (4) comprises combining the anomalous relationship graph features to reflect a temporal ordering of the anomalous relationship graph features.

Embodiment 92. The computing system of any one of Embodiments 85-91, wherein the processing operations further comprise:

ii. ranking the one or more indicator network graph features or the one or more attack campaigns.

Embodiment 93. The computing system of Embodiment 92, wherein (ii) comprises ranking the one or more indicator network graph features or the one or more attack campaigns based on an age of each attack campaign, a stage of progression of each attack campaign, or a risk score associated with each attack campaign.

Embodiment 94. The computing system of Embodiment 92 or 93, wherein (ii) comprises, for each attack campaign, determining a weighted mixture of the age of each attack campaign, the stage of progression of each attack campaign, and the risk score associated with each attack campaign, and ranking each attacked campaign based on each weighted mixture.

Embodiment 95. The computing system of any one of Embodiments 85-94, wherein the one or more electronic networks comprise a single electronic network and wherein the single electronic network comprises the two or more entities.

Embodiment 96. The computing system of any one of Embodiments 85-94, wherein the one or more electronic networks comprise at least a first electronic network and a second electronic network, wherein the first electronic network comprises a first entity of the at least two entities, and wherein the second electronic network comprises a second entity of the at least two entities.

Embodiment 97. A computing system configured to implement a method comprising:

a. receiving sensor data from one or more sensors coupled to one or more electronic networks, the one or more electronic networks comprising a plurality of entities; and
b. transmitting the sensor data for processing operations comprising:
   i. detecting, from the sensor data, a plurality of anomalous relationships between two or more entities of the plurality of entities, or between at least one entity of the plurality of entities and an external entity that is not a part of the one or more electronic networks, or between the one or more electronic networks as a whole and the external entity; and
   ii. determining, based on the plurality of anomalous relationships, that the one or more electronic networks are being subjected to one or more attack campaigns.

Embodiment 98. The computing system of Embodiment 97, wherein (ii) comprises:

1. constructing an indicator network from the plurality of anomalous relationships;
2. evaluating or aggregating indicator network graph features from the indicator network; and
3. determining, by comparing the indicator network graph features with one or more baseline graph features of a baseline graph of the one or more electronic networks, that one or more of the indicator network graph features are not indicative of normal electronic network behavior.

Embodiment 99. The computing system of Embodiment 98, wherein the indicator network comprises a plurality of indicator network subgraphs, each indicator network subgraph associated with an anomalous relationship between two or more entities of the plurality of entities, or between at least one entity of the plurality of entities and an external entity that is not a part of the one or more electronic networks, or between the one or more electronic networks as a whole and the external entity.

Embodiment 100. The computing system of Embodiment 98 or 99, wherein the indicator network graph features comprise paths, motifs, topological structures, cliques, graph embeddings, or connected components associated with the indicator network, or wherein the indicator network graph features are identified using one or more graph neural networks.

Embodiment 101. The computing system of any one of Embodiments 98-100, wherein (2) or (3) comprises counting motifs or paths on the indicator network or the baseline graph.

Embodiment 102. The computing system of any one of Embodiments 98-101, wherein (ii) further comprises:

4. combining anomalous relationship graph features from the indicator network to thereby form an attack campaign graph.

Embodiment 103. The computing system of Embodiment 102, wherein (4) comprises combining the anomalous relationship graph features to reflect a temporal ordering of the anomalous relationship graph features.

Embodiment 104. The computing system of any one of Embodiments 97-103, wherein the processing operations further comprise:

iii. ranking the one or more indicator network graph features or the one or more attack campaigns.

Embodiment 105. The computing system of Embodiment 104, wherein (iii) comprises ranking the one or more indicator networks or the one or more attack campaigns based on an age of each attack campaign, a stage of progression of each attack campaign, or a risk score associated with each attack campaign.

Embodiment 106. The computing system of Embodiment 104 or 105, wherein (iii) comprises, for each attack campaign, determining a weighted mixture of the age of each attack campaign, the stage of progression of each attack campaign, and the risk score associated with each attack campaign, and ranking each attacked campaign based on each weighted mixture.

Embodiment 107. The computing system of any one of Embodiments 97-106, wherein the one or more electronic networks comprise a single electronic network and wherein the single electronic network comprises the two or more entities.

Embodiment 108. The computing system of any one of Embodiments 97-106, wherein the one or more electronic networks comprise at least a first electronic network and a second electronic network, wherein the first electronic network comprises a first entity of the at least two entities, and wherein the second electronic network comprises a second entity of the at least two entities.

Embodiment 109. A computing system configured to implement a method comprising:

a. receiving a plurality of anomalous relationships between two or more entities of a plurality of entities, the plurality of entities forming one or more electronic networks, or between at least one entity of the plurality of entities and an external entity that is not a part of the one or more electronic networks, or between the one or more electronic networks as a whole and the external entity, the plurality of anomalous relationships detected from sensor data from one or more sensors coupled to the one or more electronic networks; and
b. determining, based on the plurality of anomalous relationships, that the one or more electronic networks are being subjected to one or more attack campaigns.

Embodiment 110. The computing system of Embodiment 109, wherein the method further comprises reporting an alert that the one or more electronic networks are being subjected to an attack campaign or storing the alert in an analytics module or a data aggregation module.

Embodiment 111. The computing system of Embodiment 109 or 110, wherein (b) comprises:

i. constructing an indicator network from the plurality of anomalous relationships;

ii. evaluating or aggregating indicator network graph features from the indicator network; and iii. determining, by comparing the indicator network graph features with one or more baseline graph features of a baseline graph of the one or more electronic networks, that one or more of the indicator network graph features are not indicative of normal electronic network behavior.

Embodiment 112. The computing system of Embodiment 111, wherein the method further comprises reporting an alert that the one or more of the indicator network graph features are not indicative of normal electronic network behavior or storing the alert in an analytics module or a data aggregation module.

Embodiment 113. The computing system of Embodiment 112, wherein the alert comprises a time-series plot showing the occurrence of one or more of the indicator network graph features over time, an indicator showing departures of the one or more indicator network graph features from the one or more baseline graph features, or annotated information about how to interpret the occurrence of the one or more indicator network graph features.

Embodiment 114. The computing system of any one of Embodiments 111-113, wherein the indicator network comprises a plurality of indicator network subgraphs, each indicator network subgraph associated with an anomalous relationship between two or more entities of the plurality of entities, or between at least one entity of the plurality of entities and an external entity that is not a part of the one or more electronic networks, or between the one or more electronic networks as a whole and the external entity.

Embodiment 115. The computing system of any one of Embodiments 111-114, wherein the indicator network graph features comprise paths, motifs, topological structures, cliques, graph embeddings, or connected components associated with the indicator network, or wherein the indicator network graph features are identified using one or more graph neural networks.

Embodiment 116. The computing system of any one of Embodiments 111-115, wherein (ii) or (iii) comprises counting motifs or paths on the indicator network or the baseline graph.

Embodiment 117. The computing system of any one of Embodiments 111-116, wherein (b) further comprises:

iv. combining anomalous relationship graph features from the indicator network to thereby form an attack campaign graph.

Embodiment 118. The computing system of Embodiment 117, wherein (iv) comprises combining the anomalous relationship graph features to reflect a temporal ordering of the anomalous relationship graph features.

Embodiment 119. The computing system of Embodiment 117 or 118, wherein the method further comprises reporting the attack campaign graph.

Embodiment 120. The computing system of any one of Embodiments 109-119, wherein the method further comprises:

c. ranking the one or more indicator network graph features or the one or more attack campaigns.

Embodiment 121. The computing system of Embodiment 120, wherein the method further comprises displaying the ranking of the one or more indicator network graph features or the one or more attack campaigns.

Embodiment 122. The computing system of Embodiment 120 or 121, wherein (c) comprises ranking the one or more one or more indicator network graph features or the attack campaigns based on an age of each attack campaign, a stage of progression of each attack campaign, or a risk score associated with each attack campaign.

Embodiment 123. The computing system of any one of Embodiments 120-122, wherein (c) comprises, for each attack campaign, determining a weighted mixture of the age of each attack campaign, the stage of progression of each attack campaign, and the risk score associated with each attack campaign, and ranking each attacked campaign based on each weighted mixture.

Embodiment 124. The computing system of any one of Embodiments 120-123, wherein the method further comprises reporting the ranking of the one or more indicator network graph features or the one or more attack campaigns.

Embodiment 125. The computing system of any one of Embodiments 109-124, wherein the method further comprises labeling the one or more attack campaigns as one or more known attack campaigns or one or more novel attack campaigns based on a comparison between the one or more attack campaigns and a database of known attack campaigns.

Embodiment 126. The computing system of any one of Embodiments 109-125, wherein the method further comprises permitting a user or analyst of the one or more electronic networks to label the one or more attack campaigns.

Embodiment 127. The computing system of any one of Embodiments 109-126, wherein the one or more electronic networks comprise a single electronic network and wherein the single electronic network comprises the two or more entities.

Embodiment 128. The computing system of any one of Embodiments 109-126, wherein the one or more electronic networks comprise at least a first electronic network and a second electronic network, wherein the first electronic network comprises a first entity of the at least two entities, and wherein the second electronic network comprises a second entity of the at least two entities.

Embodiment 129. A non-transitory machine-readable storage medium comprising computer-readable configured to implement a method comprising instructions stored thereon for causing a computer system to implement a method comprising:

a. receiving sensor data from one or more sensors coupled to one or more electronic networks, the one or more electronic networks comprising a plurality of entities;

b. detecting, from the sensor data, a plurality of anomalous relationships between two or more entities of the plurality of entities, or between at least one entity of the plurality of entities and an external entity that is not a part of the one or more electronic networks, or between the one or more electronic networks as a whole and the external entity; and c. determining, based on the plurality of anomalous relationships, that the one or more electronic networks are being subjected to one or more attack campaigns.

Embodiment 130. The non-transitory machine-readable storage medium of Embodiment 129, wherein the method further comprises reporting an alert that the one or more electronic networks are being subjected to an attack campaign or storing the alert in an analytics module or a data aggregation module.

Embodiment 131. The non-transitory machine-readable storage medium of Embodiment 129 or 130, wherein (c) comprises:

i. constructing an indicator network from the plurality of anomalous relationships;
ii. evaluating or aggregating indicator network graph features from the indicator network; and
iii. determining, by comparing the indicator network graph features with one or more baseline graph features of a baseline graph of the one or more electronic networks, that one or more of the indicator network graph features are not indicative of normal electronic network behavior.

Embodiment 132. The non-transitory machine-readable storage medium of Embodiment 131, wherein the method further comprises reporting an alert that the one or more of the indicator network graph features are not indicative of normal electronic network behavior or storing the alert in an analytics module or a data aggregation module.

Embodiment 133. The non-transitory machine-readable storage medium of Embodiment 132, wherein the alert comprises a time-series plot showing the occurrence of one or more of the indicator network graph features over time, an indicator showing departures of the one or more indicator network graph features from the one or more baseline graph features, or annotated information about how to interpret the occurrence of the one or more indicator network graph features.

Embodiment 134. The non-transitory machine-readable storage medium of any one of Embodiments 131-133, wherein the indicator network comprises a plurality of indicator network subgraphs, each indicator network subgraph associated with an anomalous relationship between two or more entities of the plurality of entities, or between at least one entity of the plurality of entities and an external entity that is not a part of the one or more electronic networks, or between the one or more electronic networks as a whole and the external entity.

Embodiment 135. The non-transitory machine-readable storage medium of any one of Embodiments 131-134, wherein the indicator network graph features comprise paths, motifs, topological structures, cliques, graph embeddings, or connected components associated with the indicator network, or wherein the indicator network graph features are identified using one or more graph neural networks.

Embodiment 136. The non-transitory machine-readable storage medium of any one of Embodiments 131-135, wherein (ii) or (iii) comprises counting motifs or paths on the indicator network or the baseline graph.

Embodiment 137. The computing system of any one of Embodiments 131-136, wherein (c) further comprises:

iv. combining anomalous relationship graph features from the indicator network to thereby form an attack campaign graph.

Embodiment 138. The non-transitory machine-readable storage medium of Embodiment 137, wherein (iv) comprises combining the anomalous relationship graph features to reflect a temporal ordering of the anomalous relationship graph features.

Embodiment 139. The non-transitory machine-readable storage medium of Embodiment 137 or 138, wherein the method further comprises reporting the attack campaign graph.

Embodiment 140. The non-transitory machine-readable storage medium of any one of Embodiments 129-139, wherein the method further comprises:

d. ranking the one or more indicator network graph features or the one or more attack campaigns.

Embodiment 141. The non-transitory machine-readable storage medium of Embodiment 140, wherein the method further comprises displaying the ranking of the one or more indicator network graph features or the one or more attack campaigns.

Embodiment 142. The non-transitory machine-readable storage medium of Embodiment 140 or 141, wherein (d) comprises ranking the one or more indicator network graph features or the one or more attack campaigns based on an age of each attack campaign, a stage of progression of each attack campaign, or a risk score associated with each attack campaign.

Embodiment 143. The non-transitory machine-readable storage medium of any one of Embodiments 140-142, wherein (d) comprises, for each attack campaign, determining a weighted mixture of the age of each attack campaign, the stage of progression of each attack campaign, and the risk score associated with each attack campaign, and ranking each attacked campaign based on each weighted mixture.

Embodiment 144. The non-transitory machine-readable storage medium of any one of Embodiments 140-143, wherein the method further comprises reporting the ranking of the one or more indicator network graph features or the one or more attack campaigns.

Embodiment 145. The non-transitory machine-readable storage medium of any one of Embodiments 129-144, wherein the method further comprises labeling the one or more attack campaigns as one or more known attack campaigns or one or more novel attack campaigns based on a comparison between the one or more attack campaigns and a database of known attack campaigns.

Embodiment 146. The non-transitory machine-readable storage medium of any one of Embodiments 129-145, wherein the method further comprises permitting a user or analyst of the one or more electronic networks to label the one or more attack campaigns.

Embodiment 147. The non-transitory machine-readable storage medium of any one of Embodiments 129-146, wherein the one or more electronic networks comprise a single electronic network and wherein the single electronic network comprises the two or more entities.

Embodiment 148. The non-transitory machine-readable storage medium of any one of Embodiments 129-146, wherein the one or more electronic networks comprise at least a first electronic network and a second electronic network, wherein the first electronic network comprises a first entity of the at least two entities, and wherein the second electronic network comprises a second entity of the at least two entities.

Embodiment 149. A non-transitory machine-readable storage medium configured to implement a method comprising:

a. receiving sensor data from one or more sensors coupled to one or more electronic networks, the one or more electronic networks comprising a plurality of entities;
b. detecting, from the sensor data, a plurality of anomalous relationships between two or more entities of the plurality of entities, or between at least one entity of the plurality of entities and an external entity that is not a part of the one or more electronic networks, or between the one or more electronic networks as a whole and the external entity; and
c. transmitting the plurality of anomalous relationships for processing operations comprising:

i. determining, based on the plurality of anomalous relationships, that the one or more electronic networks is being subjected to one or more attack campaigns.

Embodiment 150. The non-transitory machine-readable storage medium of Embodiment 149, wherein (i) comprises:

1. constructing an indicator network from the plurality of anomalous relationships;
2. evaluating or aggregating indicator network graph features from the indicator network; and
3. determining, by comparing the indicator network graph features with one or more baseline graph features of a baseline graph of the one or more electronic networks, that one or more of the indicator network graph features are not indicative of normal electronic network behavior.

Embodiment 151. The non-transitory machine-readable storage medium of Embodiment 150, wherein the indicator network comprises a plurality of indicator network subgraphs, each indicator network subgraph associated with an anomalous relationship between two or more entities of the plurality of entities or between at least one entity of the plurality of entities and an external entity that is not a part of the one or more electronic networks.

Embodiment 152. The non-transitory machine-readable storage medium of Embodiment 150 or 151, wherein the indicator network graph features comprise paths, motifs, topological structures, cliques, graph embeddings, or connected components associated with the indicator network, or wherein the indicator network graph features are identified using one or more graph neural networks.

Embodiment 153. The non-transitory machine-readable storage medium of any one of Embodiments 150-152, wherein (2) or (3) comprises counting motifs or paths on the indicator network or the baseline graph.

Embodiment 154. The non-transitory machine-readable storage medium of any one of Embodiments 150-153, wherein (i) further comprises:

4. combining anomalous relationship graph features from the indicator network to thereby form an attack campaign graph.

Embodiment 155. The non-transitory machine-readable storage medium of Embodiment 154, wherein (4) comprises combining the anomalous relationship graph features to reflect a temporal ordering of the anomalous relationship graph features.

Embodiment 156. The non-transitory machine-readable storage medium of any one of Embodiments 149-155, wherein the processing operations further comprise:

ii. ranking the one or more indicator network graph features or the one or more attack campaigns.

Embodiment 157. The non-transitory machine-readable storage medium of Embodiment 156, wherein (ii) comprises ranking the one or more indicator network graph features or the one or more attack campaigns based on an age of each attack campaign, a stage of progression of each attack campaign, or a risk score associated with each attack campaign.

Embodiment 158. The non-transitory machine-readable storage medium of Embodiment 156 or 157, wherein (ii) comprises, for each attack campaign, determining a weighted mixture of the age of each attack campaign, the stage of progression of each attack campaign, and the risk score associated with each attack campaign, and ranking each attacked campaign based on each weighted mixture.

Embodiment 159. The non-transitory machine-readable storage medium of any one of Embodiments 149-158, wherein the one or more electronic networks comprise a single electronic network and wherein the single electronic network comprises the two or more entities.

Embodiment 160. The non-transitory machine-readable storage medium of any one of Embodiments 149-158, wherein the one or more electronic networks comprise at least a first electronic network and a second electronic network, wherein the first electronic network comprises a first entity of the at least two entities, and wherein the second electronic network comprises a second entity of the at least two entities.

Embodiment 161. A non-transitory machine-readable storage medium configured to implement a method comprising:

a. receiving sensor data from one or more sensors coupled to one or more electronic networks, the one or more electronic networks comprising a plurality of entities; and
b. transmitting the sensor data for processing operations comprising:
   i. detecting, from the sensor data, a plurality of anomalous relationships between two or more entities of the plurality of entities, or between at least one entity of the plurality of entities and an external entity that is not a part of the one or more electronic networks, or between the one or more electronic networks as a whole and the external entity; and
   ii. determining, based on the plurality of anomalous relationships, that the one or more electronic networks are being subjected to one or more attack campaigns.

Embodiment 162. The non-transitory machine-readable storage medium of Embodiment 161, wherein (ii) comprises:

1. constructing an indicator network from the plurality of anomalous relationships;
2. evaluating or aggregating indicator network graph features from the indicator network; and
3. determining, by comparing the indicator network graph features with one or more baseline graph features of a baseline graph of the one or more electronic networks, that one or more of the indicator network graph features are not indicative of normal electronic network behavior.

Embodiment 163. The non-transitory machine-readable storage medium of Embodiment 162, wherein the indicator network comprises a plurality of indicator network subgraphs, each indicator network subgraph associated with an anomalous relationship between two or more entities of the plurality of entities, or between at least one entity of the plurality of entities and an external entity that is not a part of the one or more electronic networks, or between the one or more electronic networks as a whole and the external entity.

Embodiment 164. The non-transitory machine-readable storage medium of Embodiment 162 or 163, wherein the indicator network graph features comprise paths, motifs, topological structures, cliques, graph embeddings, or connected components associated with the indicator network, or wherein the indicator network graph features are identified using one or more graph neural networks.

Embodiment 165. The non-transitory machine-readable storage medium of any one of Embodiments 162-164, wherein (2) or (3) comprises counting motifs or paths on the indicator network or the baseline graph.

Embodiment 166. The non-transitory machine-readable storage medium of any one of Embodiments 162-165, wherein (ii) further comprises:

4. combining anomalous relationship graph features from the indicator network to thereby form an attack campaign graph.

Embodiment 167. The non-transitory machine-readable storage medium of Embodiment 166, wherein (4) comprises combining the anomalous relationship graph features to reflect a temporal ordering of the anomalous relationship graph features.

Embodiment 168. The non-transitory machine-readable storage medium of any one of Embodiments 161-167, wherein the processing operations further comprise:

iii. ranking the one or more indicator network graph features or the one or more attack campaigns.

Embodiment 169. The non-transitory machine-readable storage medium of Embodiment 168, wherein (iii) comprises ranking the one or more indicator network graph features or the one or more attack campaigns based on an age of each attack campaign, a stage of progression of each attack campaign, or a risk score associated with each attack campaign.

Embodiment 170. The non-transitory machine-readable storage medium of Embodiment 168 or 169, wherein (iii) comprises, for each attack campaign, determining a weighted mixture of the age of each attack campaign, the stage of progression of each attack campaign, and the risk score associated with each attack campaign, and ranking each attacked campaign based on each weighted mixture.

Embodiment 171. A non-transitory machine-readable storage medium configured to implement a method comprising:

a. receiving a plurality of anomalous relationships between two or more entities of a plurality of entities, the plurality of entities forming one or more electronic networks, or between at least one entity of the plurality of entities and an external entity that is not a part of the one or more electronic networks, or between the one or more electronic networks as a whole and the external entity, the plurality of anomalous relationships detected from sensor data from one or more sensors coupled to the one or more electronic networks; and b. determining, based on the plurality of anomalous relationships, that the one or more electronic networks are being subjected to one or more attack campaigns.

Embodiment 172. The non-transitory machine-readable storage medium of Embodiment 171, wherein the method further comprises reporting an alert that the one or more electronic networks are being subjected to an attack campaign or storing the alert in an analytics module or a data aggregation module.

Embodiment 173. The non-transitory machine-readable storage medium of Embodiment 171 or 172, wherein (b) comprises:

i. constructing an indicator network from the plurality of anomalous relationships;

ii. evaluating or aggregating indicator network graph features from the indicator network; and iii. determining, by comparing the indicator network graph features with one or more baseline graph features of a baseline graph of the one or more electronic networks, that one or more of the indicator network graph features are not indicative of normal electronic network behavior.

Embodiment 174. The non-transitory machine-readable storage medium of Embodiment 173, wherein the method further comprises reporting an alert that the one or more of the indicator network graph features are not indicative of normal electronic network behavior or storing the alert in an analytics module or a data aggregation module.

Embodiment 175. The non-transitory machine-readable storage medium of Embodiment 174, wherein the alert comprises a time-series plot showing the occurrence of one or more of the indicator network graph features over time, an indicator showing departures of the one or more indicator network graph features from the one or more baseline graph features, or annotated information about how to interpret the occurrence of the one or more indicator network graph features.

Embodiment 176. The non-transitory machine-readable storage medium of any one of Embodiments 173-175, wherein the indicator network comprises a plurality of indicator network subgraphs, each indicator network subgraph associated with an anomalous relationship between two or more entities of the plurality of entities, or between at least one entity of the plurality of entities and an external entity that is not a part of the one or more electronic networks, or between the one or more electronic networks as a whole and the external entity.

Embodiment 177. The non-transitory machine-readable storage medium of any one of Embodiments 173-176, wherein the indicator network graph features comprise paths, motifs, topological structures, cliques, graph embeddings, or connected components associated with the indicator network, or wherein the indicator network graph features are identified using one or more graph neural networks.

Embodiment 178. The non-transitory machine-readable storage medium of any one of Embodiments 173-177, wherein (ii) or (iii) comprises counting motifs or paths on the indicator network or the baseline graph.

Embodiment 179. The non-transitory machine-readable storage medium of any one of Embodiments 173-178, wherein (b) further comprises:

iv. combining anomalous relationship graph features from the indicator network to thereby form an attack campaign graph.

Embodiment 180. The non-transitory machine-readable storage medium of Embodiment 179, wherein (iv) comprises combining the anomalous relationship graph features to reflect a temporal ordering of the anomalous relationship graph features.

Embodiment 181. The non-transitory machine-readable storage medium of Embodiment 179 or 180, wherein the method further comprises reporting the attack campaign graph.

Embodiment 182. The non-transitory machine-readable storage medium of any one of Embodiments 171-181, wherein the method further comprises:

c. ranking the one or more indicator network graph features or the one or more attack campaigns.

Embodiment 183. The non-transitory machine-readable storage medium of Embodiment 182, wherein the method further comprises displaying the ranking of the one or more indicator network graph features or the one or more attack campaigns.

Embodiment 184. The non-transitory machine-readable storage medium of Embodiment 182 or 183, wherein (c) comprises ranking the one or more attack campaigns based on an age of each attack campaign, a stage of progression of each attack campaign, or a risk score associated with each attack campaign.

Embodiment 185. The non-transitory machine-readable storage medium of any one of Embodiments 182-184, wherein (c) comprises, for each attack campaign, determining a weighted mixture of the age of each attack campaign, the stage of progression of each attack campaign, and the risk score associated with each attack campaign, and ranking each attacked campaign based on each weighted mixture.

Embodiment 186. The non-transitory machine-readable storage medium of any one of Embodiments 182-185, wherein the method further comprises reporting the ranking of the one or more indicator network graph features or the one or more attack campaigns.

Embodiment 187. The non-transitory machine-readable storage medium of any one of Embodiments 171-186, wherein the method further comprises labeling the one or more attack campaigns as one or more known attack campaigns or one or more novel attack campaigns based on a comparison between the one or more attack campaigns and a database of known attack campaigns.

Embodiment 188. The non-transitory machine-readable storage medium of any one of Embodiments 171-187, wherein the method further comprises permitting a user or analyst of the one or more electronic networks to label the one or more attack campaigns.

Embodiment 189. The non-transitory machine-readable medium of any one of Embodiments 171-188, wherein the one or more electronic networks comprise a single electronic network and wherein the single electronic network comprises the two or more entities.

Embodiment 190. The non-transitory machine-readable medium of any one of Embodiments 171-188, wherein the one or more electronic networks comprise at least a first electronic network and a second electronic network, wherein the first electronic network comprises a first entity of the at least two entities, and wherein the second electronic network comprises a second entity of the at least two entities.

EXAMPLES

Example 1: Detection of an Attempt to Find Exfiltrate Sensitive Network Information and Credentials The methods and system described herein may be used, for instance, to detect a malicious actor's attempt to find and exfiltrate sensitive network information and credentials from one or more entities of an electronic networks. As such an attack campaign proceeds, the malicious actor would first scan the electronic network for open port vulnerabilities. This phase of the attack campaign would result in a first anomalous relationship as sensors on the electronic network detect anomalous external-to-internal communications on one or more entities of the electronic network. The malicious actor would next succeed in compromising a host and obtain system-level privileges. The malicious actor would next scan the host's operational technology (OT) network and discover an open port, such as an open port 455. This phase of the attack campaign would result in a second anomalous relationship as sensors on the electronic network detect anomalous local-to-local traffic on the electronic network. The malicious actor would then move laterally within the OT network and search for network information and credentials. This phase of the attack campaign would result in a third anomalous relationship as sensors on the electronic network detect anomalous local-to-local traffic on the electronic network. Once found, the malicious actor would exfiltrate such network information and credentials. This phase of the attack campaign would result in a fourth anomalous relationship as sensors on the electronic network detect local-to-external traffic on the electronic network. The first, second, third, and fourth anomalous relationship (or any subset thereof) could then be assembled into an indicator network and/or an attack campaign graph, as described herein with respect to FIGS. 1 and 3. During the real-time progression of the attack campaign, the indicator network graph features of the indicator network and/or the attack campaign could be ranked according to the threat level associated with each anomalous relationship and/or the attack campaign as a whole.

A malicious actor's attempt to find and exfiltrate sensitive network information and credentials from one or more entities of an electronic networks could also be detected using anomalous relationships between the one or more electronic networks as a whole and an external entity. As such an attack campaign proceeds, the malicious actor could exfiltrate network information and credentials through a variety of entities on the one or more electronic networks. Such exfiltration could be detected by noting that a large number of bytes was being exfiltrated from the one or more electronic networks as a whole and transmitted to an external entity. This represents a first anomalous relationship to be detected using the methods and systems herein. A second anomalous relationship showing that port 8080 on an entity was open to the external entity could also be detected. The first and second anomalous relationships (and any other anomalous relationships indicative of an exfiltration attack campaign) could then be assembled into an indicator network and/or an attack campaign graph, as described herein with respect to FIGS. 1 and 3. During the real-time progression of the attack campaign, the indicator network graph features of the indicator network and/or the attack campaign could be ranked according to the threat level associated with each anomalous relationship and/or the attack campaign as a whole.

Example 2: GUIs for Implementing the Methods and Systems Described Herein

Figure 8:
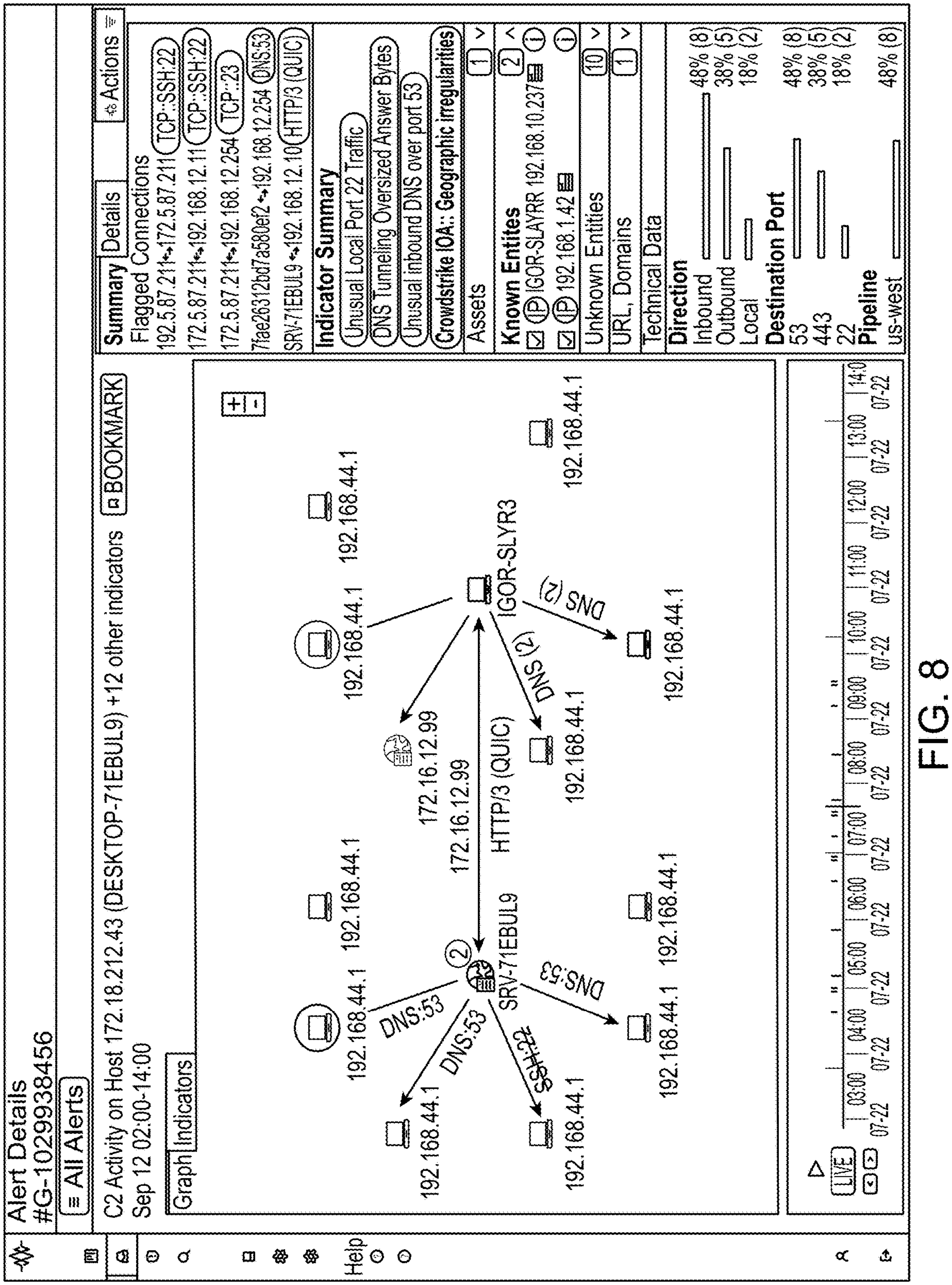
FIG. 8 depicts a first exemplary graphical user interface (GUI) for implementing the methods and systems described herein, in accordance with various embodiments.

FIG. 8 shows a first GUI for implementing the methods and systems described herein. In the example shown in FIG. 8, indicator network subgraphs are depicted in graphical form, annotating important information for a cybersecurity analyst or user of an electronic network.

Figure 9:
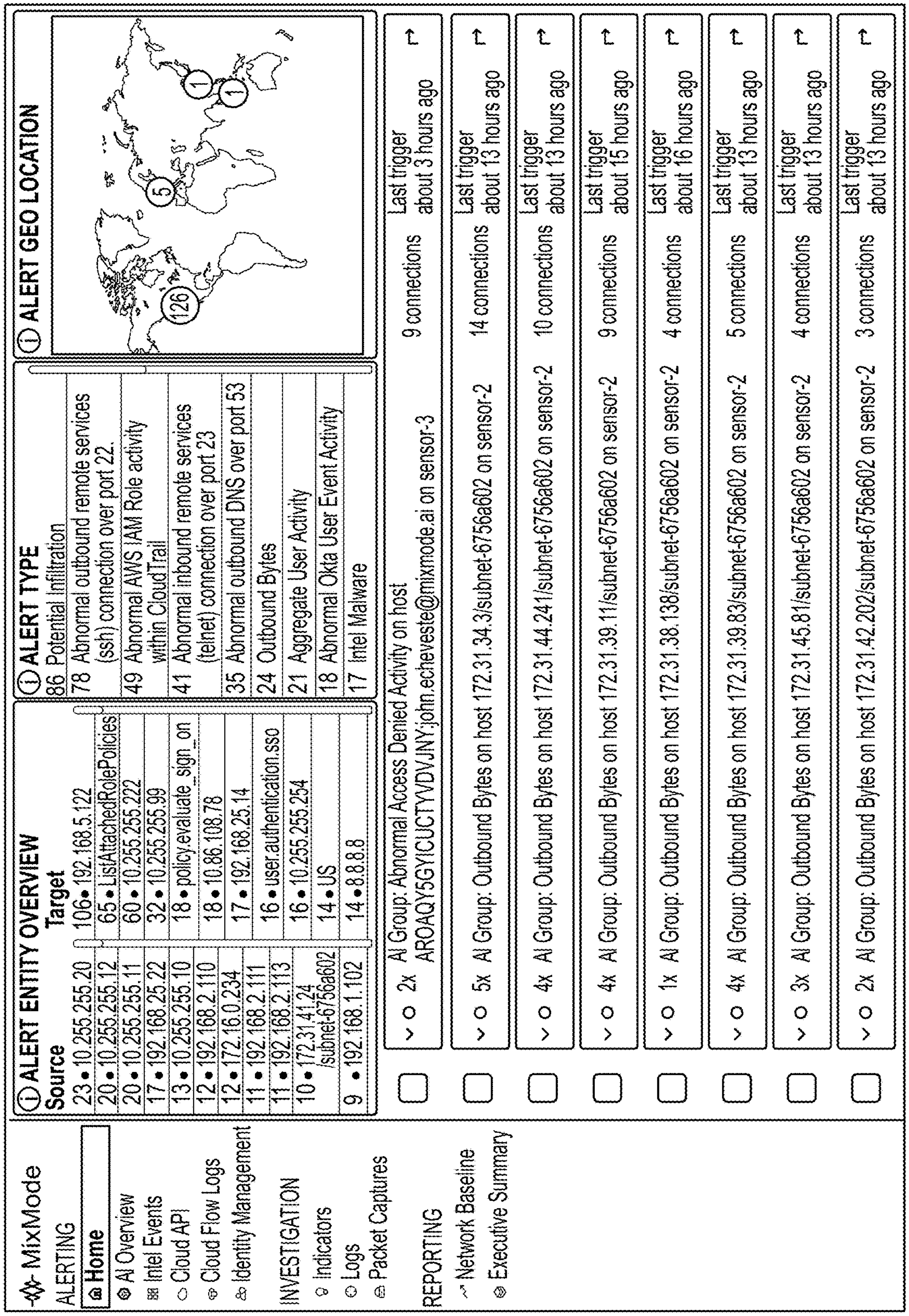
FIG. 9 depicts a second exemplary GUI for implementing the methods and systems described herein, in accordance with various embodiments.

FIG. 9 shows a second GUI for implementing the methods and systems described herein. In the example shown in FIG. 9, indicator network subgraphs are listed and ranked for a cybersecurity analyst or user of an electronic network.

The invention claimed is:

1. A computer-implemented method for using a plurality of anomalous relationships to determine that one or more electronic networks are being subjected to an attack campaign, the method comprising executing, by one or more computer processors, instructions for performing operations comprising:

a. receiving sensor data from one or more sensors coupled to one or more electronic networks, the one or more electronic networks comprising a plurality of entities;

b. detecting, from the sensor data, a plurality of anomalous relationships between two or more entities of the plurality of entities, or between at least one entity of the plurality of entities and an external entity that is not a part of the one or more electronic networks, or between the one or more electronic networks as a whole and the external entity; and c. determining, based on the plurality of anomalous relationships, that the one or more electronic networks are being subjected to one or more attack campaigns, including by constructing an indicator network from the plurality of anomalous relationships, the indicator network comprising pairs of anomalous communication patterns, wherein each pair of patterns is an edge in the indicator network and wherein each pair of patterns comprises two entities of the plurality of entities and a directed link between the two entities or between the at least one entity on the one or more electronic networks and an external entity that is not a part of the one or more electronic networks.

2. The method of claim 1, the operations further comprising reporting an alert that one or more electronic networks are being subjected to an attack campaign or storing the alert in an analytics module or a data aggregation module.

3. The method of claim 1, wherein (c) comprises:

evaluating or aggregating indicator network graph features from the indicator network; and determining, by comparing the indicator network graph features with one or more baseline graph features of a baseline graph of the one or more electronic networks, that one or more of the indicator network graph features are not indicative of normal electronic network behavior.

4. The method of claim 1, wherein the operations further comprise reporting an alert that the one or more of the indicator network graph features are not indicative of normal electronic network behavior or storing the alert in an analytics module or a data aggregation module.

5. The method of claim 4, wherein the alert comprises a time-series plot showing the occurrence of one or more of the indicator network graph features over time, an indicator showing departures of the one or more indicator network graph features from the one or more baseline graph features, or annotated information about how to interpret the occurrence of the one or more indicator network graph features.

6. The method of claim 1, wherein the indicator network comprises a plurality of indicator network subgraphs, each indicator network subgraph associated with an anomalous relationship between two or more entities of the plurality of entities, or between at least one entity of the plurality of entities and an external entity that is not a part of the one or more electronic networks, or between the one or more electronic networks as a whole and the external entity.

7. The method of claim 1, wherein the indicator network graph features comprise paths, motifs, topological structures, cliques, graph embeddings, or connected components associated with the indicator network, or wherein the indicator network graph features are identified using one or more graph neural networks.

8. The method of claim 3, wherein the operation of:

evaluating or aggregating indicator network graph features from the indicator network; or determining that one or more of the indicator network graph features are not indicative of normal electronic network behavior by comparing indicator network graph features with one or more baseline graph features of a baseline graph of the one or more electronic networks comprises counting motifs or paths on the indicator network or the baseline graph.

9. The method of claim 1, wherein (c) further comprises:

combining anomalous relationship graph features from the indicator network to thereby form an attack campaign graph, the anomalous relationship graph features having been determined by comparing indicator network graph features with one or more baseline graph features of a baseline graph of the one or more electronic networks to determine that one or more of the indicator network graph features are not indicative of normal electronic network behavior.

10. The method of claim 9, wherein combining anomalous relationship graph features from the indicator network to thereby form an attack campaign graph comprises combining anomalous relationship graph features to reflect a temporal ordering of the anomalous relationship graph features.

11. The method of claim 9, the operations further comprising reporting the attack campaign graph.

12. The method of claim 1, the operations further comprising:

d. ranking the one or more indicator network graph features or the one or more attack campaigns.

13. The method of claim 12, the operations further comprising displaying the ranking of the one or more indicator network graph features or the one or more attack campaigns.

14. The method of claim 12, wherein (d) comprises ranking the one or more indicator network graph features or the one or more attack campaigns based on an age of each attack campaign, a stage of progression of each attack campaign, or a risk score associated with each attack campaign.

15. The method of claim 12, wherein (d) comprises, for each attack campaign, determining a weighted mixture of the age of each attack campaign, the stage of progression of each attack campaign, and the risk score associated with each attack campaign, and ranking each attacked campaign based on each weighted mixture.

16. The method of claim 12, the operations further comprising reporting the ranking of the one or more indicator network graph features or the one or more attack campaigns.

17. The method of claim 1, the operations further comprising labeling the one or more attack campaigns as one or more known attack campaigns or one or more novel attack campaigns based on a comparison between the one or more attack campaigns and a database of known attack campaigns.

18. The method of claim 1, wherein the one or more electronic networks comprise a single electronic network and wherein the single electronic network comprises the two or more entities.

19. The method of claim 1, wherein the one or more electronic networks comprise at least a first electronic network and a second electronic network, wherein the first electronic network comprises a first entity of the at least two entities, and wherein the second electronic network comprises a second entity of the at least two entities.

20. The method of claim 1, wherein the directed link comprises information about a degree of risk of an anomalous relationship between the two entities or between the at least one entity on the one or more electronic networks and an external entity that is not a part of the one or more electronic networks.

* * * * *